United States Patent [19]
Suzuki et al.

[11] Patent Number: 6,134,667
[45] Date of Patent: Oct. 17, 2000

[54] COMPUTER SYSTEM AND ITS COOLING CONTROL METHOD

[75] Inventors: Shinichi Suzuki; Hiroaki Yokomichi, both of Tokyo, Japan

[73] Assignee: Kabushiki Kaisha Toshiba, Kawasaki, Japan

[21] Appl. No.: 09/073,268

[22] Filed: May 6, 1998

[30] Foreign Application Priority Data

May 9, 1997 [JP] Japan .................................. 9-119640

[51] Int. Cl.⁷ .............................. G06F 1/20; H05K 7/20; H02P 7/00; H01L 23/467

[52] U.S. Cl. ......................... 713/300; 702/132; 361/687; 361/688; 361/695; 318/471; 340/584; 388/934; 713/322

[58] Field of Search ...................... 713/300, 322, 713/320; 702/65, 130, 132; 361/33, 687, 688, 695, 697; 318/471, 268; 165/80.3, 244; 340/584, 635; 388/934

[56] References Cited

U.S. PATENT DOCUMENTS

| | | |
|---|---|---|
| 4,459,815 | 7/1984 | Yokoyama . |
| 4,663,725 | 5/1987 | Truckenbrod et al. . |
| 5,363,024 | 11/1994 | Hiratsuka et al. . |
| 5,469,320 | 11/1995 | Walker et al. . |
| 5,491,610 | 2/1996 | Mok et al. . |
| 5,769,705 | 6/1998 | O'Callaghan et al. . |
| 5,926,386 | 7/1999 | Ott et al. . |
| 5,929,581 | 7/1999 | Van Brocklin et al. . |
| 5,930,736 | 7/1999 | Miller et al. . |
| 5,963,887 | 10/1999 | Giorgio . |

FOREIGN PATENT DOCUMENTS

| | | |
|---|---|---|
| 2-123413 | 5/1990 | Japan . |
| 5-127785 | 5/1993 | Japan . |
| 7-28561 | 1/1995 | Japan . |
| 7-93055 | 4/1995 | Japan . |
| 7-302136 | 11/1995 | Japan . |
| 8-46102 | 2/1996 | Japan . |
| 8-115142 | 5/1996 | Japan . |

*Primary Examiner*—Gopal C. Ray
*Attorney, Agent, or Firm*—Finnegan, Henderson, Farabow, Garrett & Dunner, L.L.P.

[57] ABSTRACT

Temperature sensors A, B, and C are arranged near a CPU, HDD, and PC card controller, and monitor changes in temperature of these devices. When a given temperature sensor detects that the temperature of the corresponding device has exceeded a threshold temperature, the device to be cooled is determined by identifying that temperature sensor, and cooling is done at power suited to the temperature characteristics of the determined device.

35 Claims, 20 Drawing Sheets

| BATTERY SAVE MODE | FULL POWER | LOW POWER | USER SETTING |
|---|---|---|---|
| COOLING METHOD | PERFORMANCE (MOTOR FAN) | QUIET (CPU CLOCK) | PERFORMANCE/QUIET |

FAN ROTATIONAL SPEED   0:STOP   1:LOW   2:MEDIUM   3:HIGH

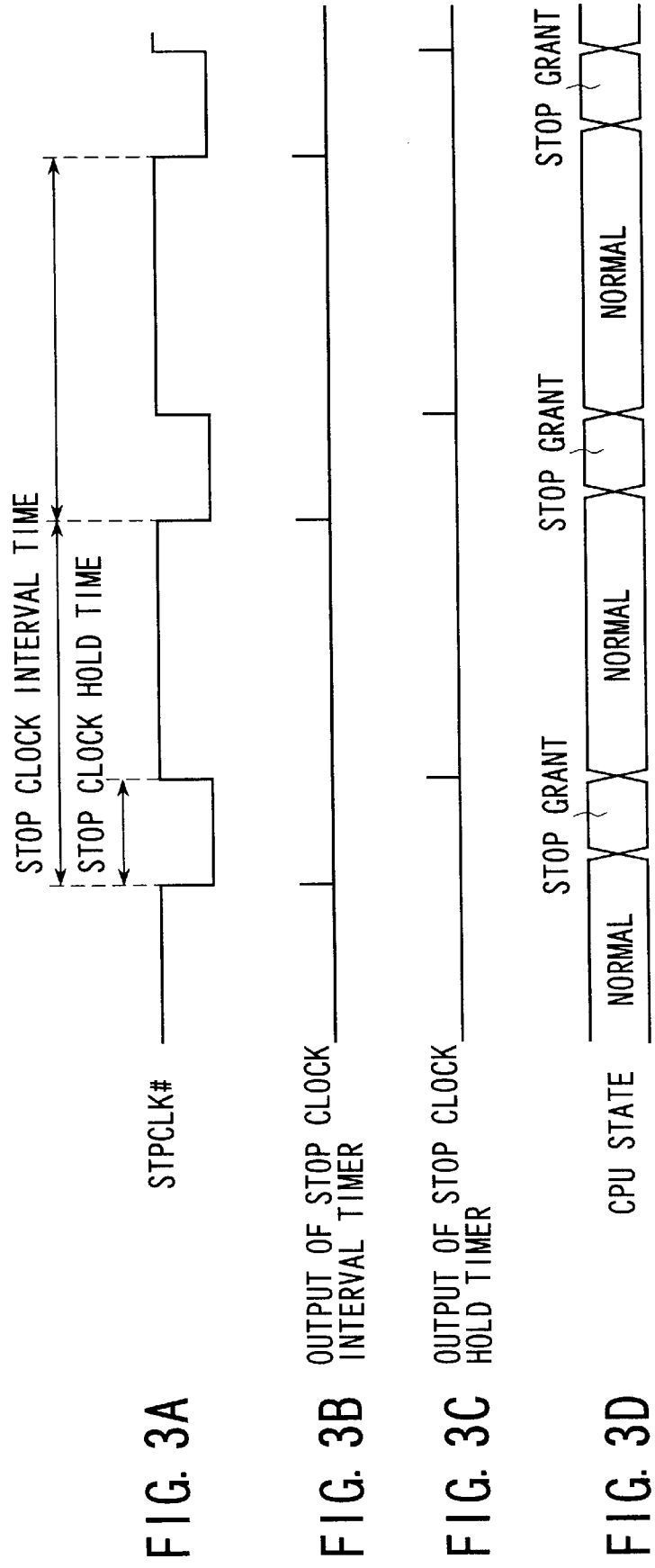

SETUP

--- MEMORY ---
Total = 8192KB
Base = 640KB
Extended = 7360KB
Shadow BIOS ROM = 192KB --- DISPLAY ---
Display Adaptor = VGA Compatible
LCD Display Mode = Color
LCD Display Colors = 16M Colors
Power On Display = Internal/External
Text Mode Stretch = Enabled --- HARD DISK ---
HDD Mode = Enhanced IDE (Normal)

--- I/O PORT ---
Serial Port = COM1 (IRQ4/3F8H)
Parallel Port = LPT1 (378H)
Sound System = Address/IRQ/DMA --- PASSWORD ---
Not Registered --- OTHERS ---
Power-up Mode = Boot
CPU Cache = Enabled
Battery Save Mode = Full Power
Alarm Volume = High
System Beep = Enabled
Alarm Power On = Disabled
Keyboard = Layout/Fn
Pointing Devices = Auto-Selected
Boot Priority = FDD → HDD

FIG. 4

FULL POWER

```
┌─────────── OTHERS ────────────┐
│ Power-up Mode    = Boot       │
│ CPU Cache        = Enabled    │
│ Battery Save Mode = Full Power│
│ Ala ┌──── BATTERY SAVE OPTIONS ────┐
│ Sys │ Processing Speed  = High     │
│     │ CPU Sleep Mode    = Disabled │
│ Ala │ Display Auto Off  = 30Min.   │
│ Key │ HDD Auto Off      = Disabled │
│ Poi │                              │
│ Boo │ LCD Brightness    = Bright   │
│     │ Cooling Method    = Performance │
└─────┴──────────────────────────────┘
```

FIG. 5A

LOW POWER

```
┌─────────── OTHERS ────────────┐
│ Power-up Mode    = Boot       │
│ CPU Cache        = Enabled    │
│ Battery Save Mode = Low Power │
│ Ala ┌──── BATTERY SAVE OPTIONS ────┐
│ Sys │ Processing Speed  = Low      │
│     │ CPU Sleep Mode    = Enabled  │
│ Ala │ Display Auto Off  = 30Min.   │
│ Key │ HDD Auto Off      = Enabled  │
│ Poi │                              │
│ Boo │ LCD Brightness    = Bright   │
│     │ Cooling Method    = Quiet    │
└─────┴──────────────────────────────┘
```

FIG. 5B

USER SETTING

```
┌─────────── OTHERS ────────────┐
│ Power-up Mode    = Boot       │
│ CPU Cache        = Enabled    │
│ Battery Save Mode = User Setting │
│ Ala ┌──── BATTERY SAVE OPTIONS ────┐
│ Sys │ Processing Speed  =          │
│     │ CPU Sleep Mode    =          │
│ Ala │ Display Auto Off  =          │
│ Key │ HDD Auto Off      =          │
│ Poi │                              │
│ Boo │ LCD Brightness    =          │
│     │ Cooling Method    =          │
└─────┴──────────────────────────────┘
```

FIG. 5C

| TEMPERATURE | COOLING METHOD | FAN ROTATIONAL SPEED |
|---|---|---|
| A2 OR MORE | COOLING METHOD A | FAN = 3 |
| A1 OR LESS | RELEASE OF COOLING METHOD A | FAN = 0 |
| B2 OR MORE | COOLING METHOD B | FAN = 2 |
| B1 OR LESS | RELEASE OF COOLING METHOD B | FAN = 0 |
| C2 OR MORE | COOLING METHOD C | FAN = 1 |
| C1 OR LESS | RELEASE OF COOLING METHOD C | FAN = 0 |

| TEMPERATURE | COOLING METHOD | FAN ROTATIONAL SPEED | CPU SPEED |
|---|---|---|---|
| A2 OR MORE | COOLING METHOD A | FAN = 3 | LOW |
| A1 OR LESS | RELEASE OF COOLING METHOD A | FAN = 0 | HIGH |
| B2 OR MORE | COOLING METHOD B | FAN = 2 | HIGH |
| B1 OR LESS | RELEASE OF COOLING METHOD B | FAN = 0 | HIGH |
| C2 OR MORE | COOLING METHOD C | FAN = 1 | HIGH |
| C1 OR LESS | RELEASE OF COOLING METHOD C | FAN = 0 | HIGH |

FIG. 9

RELATION AMONG TEMPERATURE RISE, FAN ROTATIONAL SPEED AND CPU SPEED

| | | |
|---|---|---|
| A2 OR MORE | FAN = 3 | CPU = LOW |
| B2 OR MORE | FAN = 2 | CPU = HIGH |
| A1 OR LESS | FAN = 1 | CPU = HIGH |
| C2 OR MORE | FAN = 1 | CPU = HIGH |
| B1 OR LESS | FAN = 0 | CPU = HIGH |
| C1 OR LESS | FAN = 0 | CPU = HIGH |

FIG. 10A

RELATION AMONG TEMPERATURE FALL, FAN ROTATIONAL SPEED AND CPU SPEED

| | | |
|---|---|---|
| A2 OR MORE | FAN = 3 | CPU = LOW |
| B2 OR MORE | FAN = 3 | CPU = LOW |
| A1 OR LESS | FAN = 2 | CPU = HIGH |
| C2 OR MORE | FAN = 2 | CPU = HIGH |
| B1 OR LESS | FAN = 1 | CPU = HIGH |
| C1 OR LESS | FAN = 0 | CPU = HIGH |

FIG. 10B

| BATTERY SAVE MODE | FULL POWER | LOW POWER | USER SETTING |
|---|---|---|---|
| COOLING METHOD | PERFORMANCE (MOTOR FAN) | QUIET (CPU CLOCK) | PERFORMANCE/QUIET |

| FAN | 0 : ALL FANS ARE STOPPED | 1 : OPERATION OF SINGLE FAN | 2 : OPERATION OF TWO FANS | 3 : OPERATION OF THREE FANS |
|---|---|---|---|---|

FIG. 14

| TEMPERATURE | COOLING METHOD | NUMBER OF FANS |
|---|---|---|
| A2 OR MORE | COOLING METHOD A | FAN = 3 |
| A1 OR LESS | RELEASE OF COOLING METHOD A | FAN = 0 |
| B2 OR MORE | COOLING METHOD B | FAN = 2 |
| B1 OR LESS | RELEASE OF COOLING METHOD B | FAN = 0 |
| C2 OR MORE | COOLING METHOD C | FAN = 1 |
| C1 OR LESS | RELEASE OF COOLING METHOD C | FAN = 0 |

FIG. 15

| TEMPERATURE | COOLING METHOD | NUMBER OF FANS | CPU SPEED |
|---|---|---|---|
| A2 OR MORE | COOLING METHOD A | FAN = 3 | LOW |
| A1 OR LESS | RELEASE OF COOLING METHOD A | FAN = 0 | HIGH |
| B2 OR MORE | COOLING METHOD B | FAN = 2 | HIGH |
| B1 OR LESS | RELEASE OF COOLING METHOD B | FAN = 0 | HIGH |
| C2 OR MORE | COOLING METHOD C | FAN = 1 | HIGH |
| C1 OR LESS | RELEASE OF COOLING METHOD C | FAN = 0 | HIGH |

FIG. 16

| BATTERY SAVE MODE | FULL POWER | LOW POWER | USER SETTING |
|---|---|---|---|
| COOLING METHOD | PERFORMANCE (MOTOR FAN) | QUIET (CPU CLOCK) | PERFORMANCE/QUIET |

| | | |
|---|---|---|
| FAN_A | 0 : STOP | 1 : OPERATION |
| FAN_B | 0 : STOP | 1 : OPERATION |
| FAN_C | 0 : STOP | 1 : OPERATION |

FIG. 18

| TEMPERATURE | COOLING METHOD | FAN (STOP/OPERATION) |
|---|---|---|
| A2 OR MORE | COOLING METHOD A | FAN_A = 1 |
| A1 OR LESS | RELEASE OF COOLING METHOD A | FAN_A = 0 |
| B2 OR MORE | COOLING METHOD B | FAN_B = 1 |
| B1 OR LESS | RELEASE OF COOLING METHOD B | FAN_B = 0 |
| C2 OR MORE | COOLING METHOD C | FAN_C = 1 |
| C1 OR LESS | RELEASE OF COOLING METHOD C | FAN_C = 0 |

FIG. 19

| TEMPERATURE | COOLING METHOD | FAN (STOP/OPERATION) | CPU SPEED |
|---|---|---|---|
| A2 OR MORE | RELEASE OF COOLING METHOD A | FAN_A = 1 | LOW |
| A1 OR LESS | COOLING METHOD A | FAN_A = 0 | HIGH |
| B2 OR MORE | COOLING METHOD B | FAN_B = 1 | HIGH |
| B1 OR LESS | RELEASE OF COOLING METHOD B | FAN_B = 0 | HIGH |
| C2 OR MORE | COOLING METHOD C | FAN_C = 1 | HIGH |
| C1 OR LESS | RELEASE OF COOLING METHOD C | FAN_C = 0 | HIGH |

FIG. 20

FULL POWER

```
                 ┌─ OTHERS ──────────────────────┐
                 │ Power-up Mode      = Boot     │
                 │ CPU Cache          = Enabled  │
                 │ Battery Save Mode  = Full Power│
                 │ Ala ┌─ BATTERY SAVE OPTIONS ──────────┐
                 │ Sys │ Processing Speed   = High       │
                 │     │ CPU Sleep Mode     = Disabled   │
                 │ Ala │ Display Auto Off   = 30Min.     │
                 │ Key │ HDD Auto Off       = Disabled   │
                 │ Poi │                                 │
                 │ Boo │ LCD Brightness     = Bright     │
                 │     │ Cooling Method     = Performance│
                 │     │ Cooling Level Menu = Normal/User│
                 └─────┴─────────────────────────────────┘
```

FIG. 21

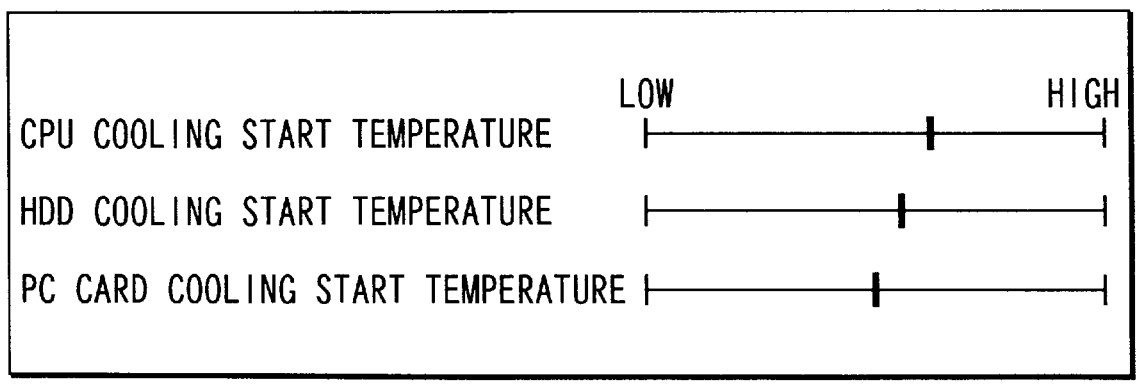

FIG. 22

COMPUTER SYSTEM AND ITS COOLING CONTROL METHOD

BACKGROUND OF THE INVENTION

The entire contents of Japanese Patent Application No. 9-119640 filed on May 9, 1997 are incorporated herein by reference.

The present invention relates to a computer system and, more particularly, to a computer system having a function of preventing overheating of devices in the system.

In recent years, various portable laptop type or notebook type personal computers that can be driven by batteries have been developed. Such personal computers use higher-performance CPUs, and the users can easily acquire a comfortable use environment.

However, as the performance of the CPU is improved, the amount of heat generated by the CPU increases to cause troubles. More specifically, the internal temperature of the computer may have exceeded the operation guarantee temperatures of other members due to heat generated by the CPU, or the CPU itself may cause operation errors by that heat.

To solve such problems, recently, a method of monitoring the temperature of the CPU using a temperature sensor disposed near the CPU, and cooling the CPU using a cooling fan when the heat generated is considerable is used. In this case, when the CPU temperature has reached a fan rotation start temperature set in advance, the rotation of the cooling fan is started to cool the CPU. When the CPU temperature falls below a fan rotation stop temperature set in advance, the rotation of the cooling fan is stopped.

In a personal computer, in practice, the CPU is not the one and only heat source, and for example, a hard disk drive, PC card controller, and the like generate heat at considerably high temperature.

However, since the conventional cooling control method using a cooling fan uses only one temperature sensor, when the CPU temperature falls, the rotation of the fan is stopped even when other devices such as the hard disk drive, PC card controller, and the like are overheated. For this reason, the hard disk drive, PC card controller, and the like cannot be sufficiently cooled.

This problem can be solved to some extent by setting the fan rotation start temperature, i.e., the CPU temperature that starts fan rotation, at a sufficiently low temperature. In this case, even when the temperatures of the hard disk drive and PC card controller are low and they need not be cooled, the fan is rotated, thus increasing consumption power and noise due to wasteful fan rotation.

Note that another conventional cooling control method uses a plurality of temperature sensors, but does not perform cooling control in correspondence with heat sources. More specifically, the fan is controlled stepwise with respect to the entire housing, but no cooling control in units of heat sources is done. For this reason, the conventional cooling control method cannot perform optimal cooling control for the individual devices having different heat generation amounts.

BRIEF SUMMARY OF THE INVENTION

It is an object of the present invention to provide a computer system and its cooling control method, which can use cooling methods most suited to a plurality of devices that must be protected from overheating.

A computer system according to the present invention comprises a cooling fan, a plurality of temperature sensors arranged near a plurality of devices to be cooled so as to respectively detect temperatures near the corresponding devices, and fan rotational speed control means for identifying the temperature sensor that has detected a temperature not less than a predetermined threshold temperature, and variably controlling a rotational speed of the cooling fan in accordance with the device corresponding to the identified temperature sensor.

In this computer system, the temperature sensors are arranged in units of devices to be cooled, and changes in temperature of the individual devices are respectively monitored. By identifying the temperature sensor that has detected a temperature exceeding a threshold value, the device that must be cooled is determined, and cooling is done at cooling power corresponding to the determined device. In this manner, cooling at powers most suited to the temperature characteristics of the individual devices can be realized. Also, since the threshold temperatures can be individually set in units of sensors, not only the cooling powers but also the cooling start temperature can be set at optimal values in units of devices. Therefore, measures against overheating of the individual devices can be taken without wastefully rotating the fan.

Additional objects and advantages of the invention will be set forth in the description which follows, and in part will be obvious from the description, or may be learned by practice of the invention. The objects and advantages of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 3A to 3D are views explaining a CPU operational performance control operation used in the first embodiment;

FIG. 4 is a view showing an example of a setup screen used in the first embodiment;

FIGS. 5A to 5C are views explaining contents of a battery save option window-displayed on the setup screen in FIG. 4;

FIG. 9 is a view explaining another example of a relation between temperatures and cooling methods for each device in the first embodiment;

FIGS. 10A and 10B are views showing states of the fan rotational speed and CPU operational speed in the first embodiment;

FIG. 14 is a view explaining correspondence among three battery save modes and two cooling methods provided in the second embodiment;

FIG. 15 is a view explaining a relation between temperatures and cooling methods for each device in the second embodiment;

FIG. 16 is a view explaining another example of a relation between temperatures and cooling methods for each device in the first embodiment;

FIG. 18 is a view explaining correspondence among three battery save modes and two cooling methods provided in the third embodiment;

FIG. 19 is a view explaining a relation between temperatures and cooling methods for each device in the third embodiment;

FIG. 20 is a view explaining another example of a relation between temperatures and cooling methods for each device in the third embodiment;

FIG. 21 is a view showing a modification of a setup screen used in each embodiment of the present invention;

FIG. 22 is a view showing an example of a cooling level setting window used in each device of the present invention;

DETAILED DESCRIPTION OF THE INVENTION

The preferred embodiments of the present invention will be described hereinafter with reference to the accompanying drawings.

Figure 1:
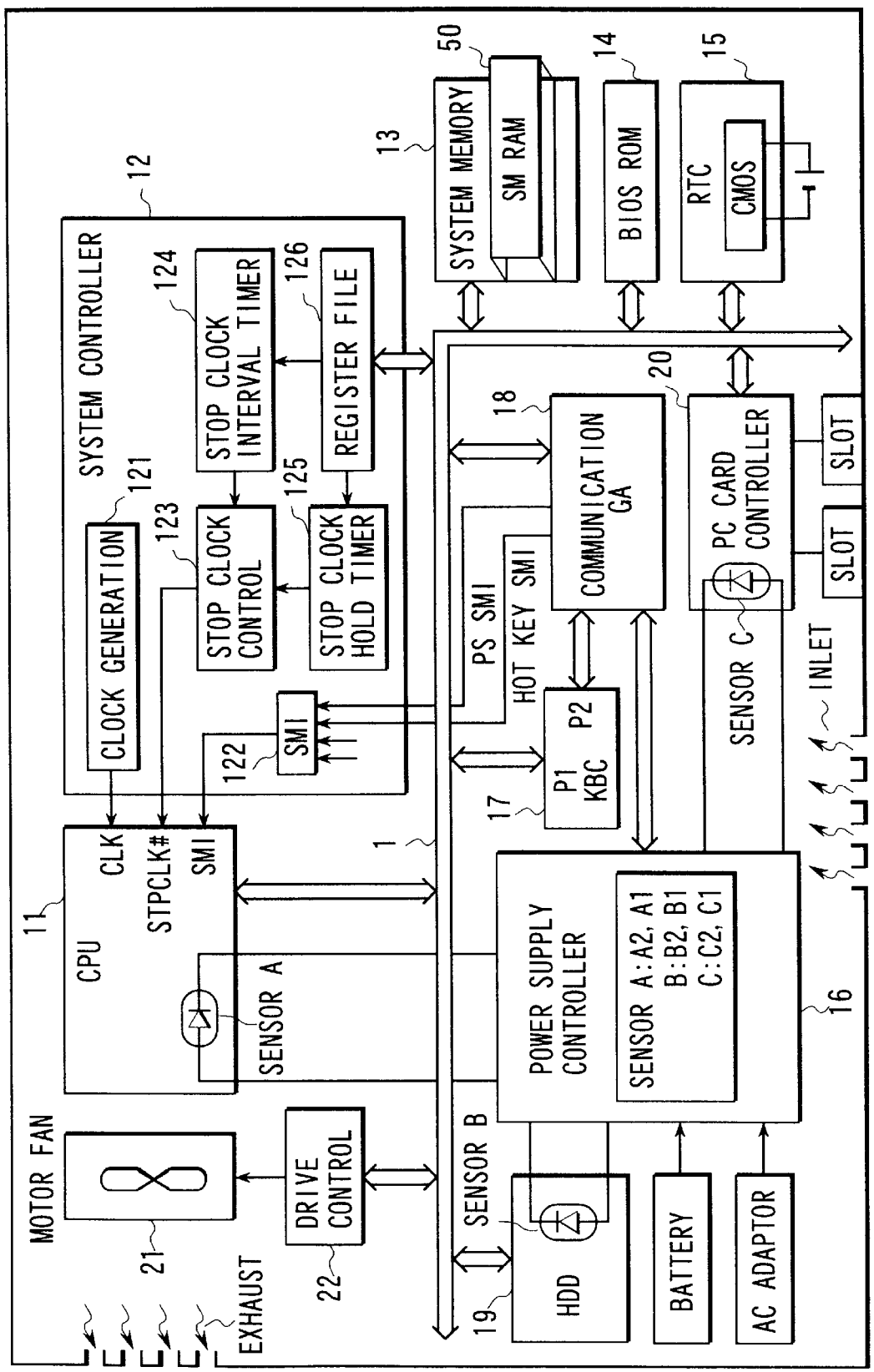
FIG. 1 is a block diagram showing an arrangement of a computer system according to a first embodiment of the present invention.

FIG. 1 shows the arrangement of a computer system according to the first embodiment of the present invention. This computer system is a laptop type or notebook type portable personal computer system, and comprises a CPU 11, system controller 12, system memory 13, BIOS-ROM 14, real-time clock (RTC) 15, power supply controller 16, keyboard controller 17, communication gate array 18, hard disk drive 19, PC card controller 20, cooling motor fan 21, fan drive control circuit 22, and three temperature sensors A, B, and C, as shown in FIG. 1.

Figure 2:
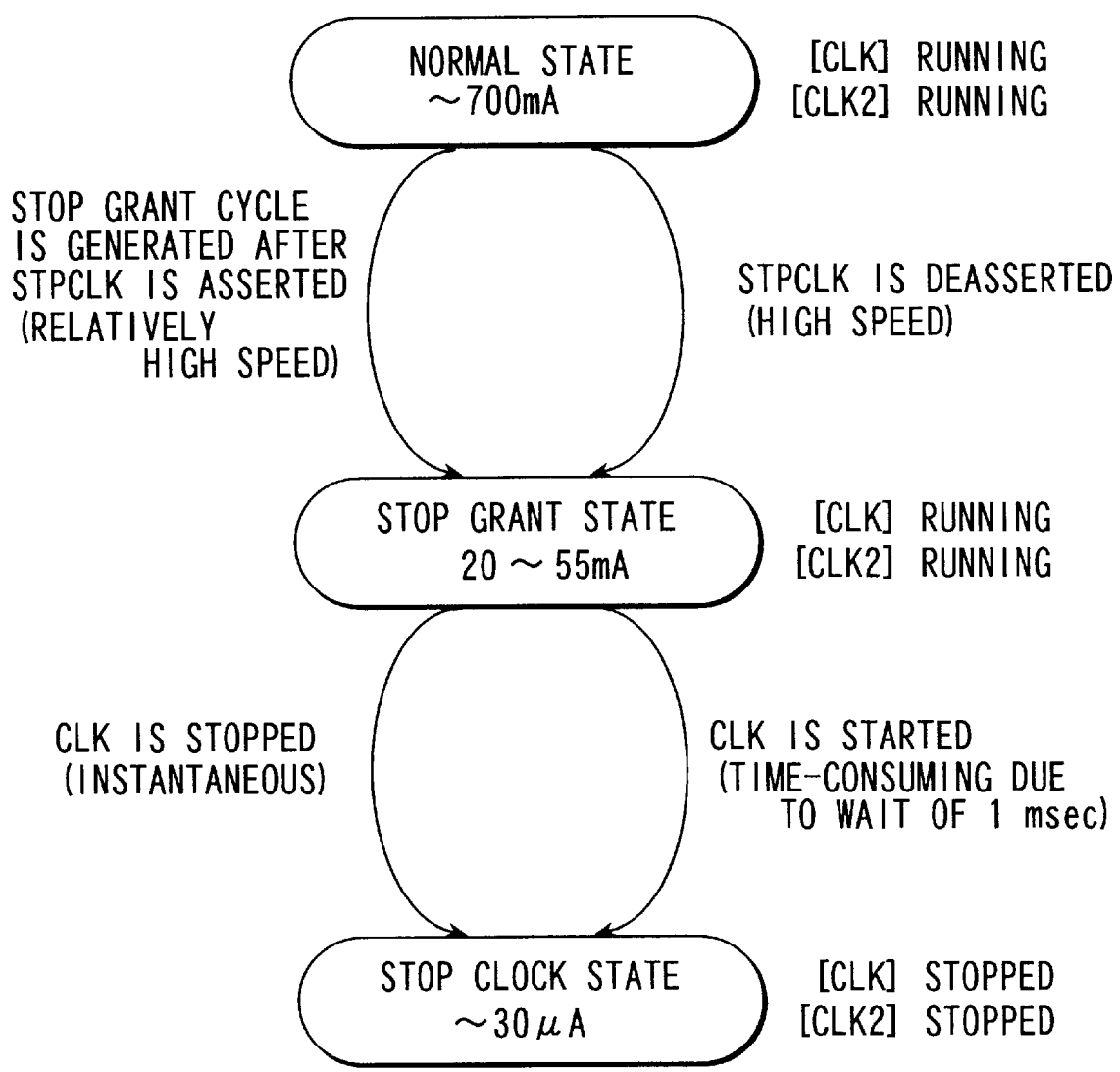
FIG. 2 is a view explaining three CPU operation states provided in the system according to the first embodiment.

The CPU 11 uses, e.g., a microprocessor "Pentium" available from Intel Corp. (USA). The CPU 11 has an internal PLL circuit, which generates internal clocks CLK2 equal to or higher than external clocks CLK on the basis of the external clocks CLK. As shown in FIG. 2, the CPU 11 has three operation states with different consumption power amounts, i.e., a normal state, stop grant state, and stop clock state.

The normal state is the normal operation state of the CPU 11, and commands are executed in this normal state. The normal state requires the largest consumption power amount, and its consumption current is about 700 mA.

Consumption power is smallest in the stop clock state, and its consumption current is about 30 μA. In this stop clock state, not only execution of commands is stopped, but also the external and internal clocks CLK and CLK2 are stopped.

The stop grant state is an intermediate operation state between the normal state and stop clock state, and its consumption current is relatively as small as about 20 to 55 mA. In the stop grant state, commands are not executed. Although both the external and internal clocks CLK and CLK2 are running, the internal clocks CLK2 are inhibited from being supplied to a CPU internal logic (CPU core). The stop grant state can stop the external clocks CLK, and when the external clocks CLK are stopped in the stop grant state, the CPU 11 transits from the stop grant state to the stop clock state.

Transition between the normal state and stop grant state can be done at high speed by a stop clock (STPCLK#) signal.

That is, when the STPCLK# signal supplied to the CPU 11 is enabled, i.e., is set active in the normal state, the CPU 11 executes a stop grant cycle after it clears internal pipeline without executing the next command upon completion of the currently executed command, and transits from the normal state to the stop grant state. On the other hand, when the STPCLK# signal is disabled, i.e., set inactive in the stop grant state, the CPU 11 transits from the stop grant state to the normal state, and restarts execution of the next command.

Transition from the stop grant state to stop clock state is instantaneously done by stopping the external clocks CLK. When supply of the external clocks CLK to the CPU 11 is restarted in the stop clock state, the CPU 11 transits to the stop grant state 1 ms later. In this manner, recovery from the stop clock state requires a long time.

As described above, the stop grant state has features in that it requires very low power as compared to the normal state, and can be quickly resumed to the normal state, i.e., command execution state by the STPCLK# signal. For this reason, this system uses the stop grant state as a function of dropping the CPU operation speed.

Furthermore, the CPU 11 shown in FIG. 1 has the following system management function.

That is, the CPU 11 has an operation mode called a system management mode (SMM) for executing a system management program dedicated to system management or power management, in addition to a real mode, protect mode, and virtual 86 mode for executing programs such as application programs, OS, and the like.

The real mode allows the CPU 11 to access a memory space of a maximum of 1 MB, and a physical address is determined by an offset value from a base address expressed by a segment register. The protect mode allows the CPU 11 to access a memory space of a maximum of 4 GB per task, and a linear address is determined using an address mapping table called a descriptor table. The linear address is finally converted into a physical address by paging. The virtual 86 mode allows a program which is configured to operate in the real mode to operate in the protect mode, and the program in the real mode is processed as one task in the protect mode.

The system management mode (SMM) is a pseudo real mode. In this mode, the descriptor table is not looked up, and paging is not executed. When a system management interrupt (SMI) is issued to the CPU 11, the operation mode of the CPU 11 is switched from the real mode, protect mode, or virtual 86 mode to the SMM. In the SMM, the system management program dedicated to system management or power save control is executed.

The SMI is one of non-maskable interrupts (NMIs), but is a top-priority interrupt having higher priority than a normal NMI or a maskable interrupt INTR. By issuing this SMI, various SMI service routines prepared as the system management program can be started independently of the currently executed application program or OS environment. In this computer system, in order to cool devices in the system independently of the OS environment, rotation control of the motor fan 21 and operation speed control of the CPU 11 are done using this SMI.

The system controller 12 is a gate array for controlling memories and I/Os in the system, and hardware for controlling generation of the SMI signal and STPCLK# signal to the CPU 11 is built in the controller 12.

The system memory 13 is a main memory which stores the OS, the application program to be processed, user data and the like created by the application program, and the like. An SRAM (System Management RAM) 50 is an overlay mapped on an address space from addresses 30000H to 3FFFFH on the main memory 13, and is accessible only when the SMI signal is input to the CPU 11. The address range where the SMRAM is mapped is not a permanent one, and can be changed to an arbitrary location in a 4 GB CP memory address space by a register called SMBASE. The SMBASE register is accessible only in the SMM. The initial value of the SMBASE register is address 3000H.

When the CPU 11 enters the SMM, the CPU status, i.e., registers and the like of the CPU 11 upon generation of the SMI, are saved in the SMRAM 50 in the stack format. The SMRAM 50 stores a command for calling the system management program in the BIOS-ROM 14. This command is initially executed when the CPU 11 enters the SMM, and upon execution of this command, the control is passed to the system management program.

The BIOS-ROM 14 stores a BIOS (Basic I/O System), and comprises a flash memory to allow program rewrites. The BIOS is programmed to operate in the real mode. The BIOS includes an IRT routine executed in system boot, device drivers for controlling various I/O devices, and the system management program. The system management program is executed in the SMM, and includes an SMI program including an SMI processing routine for controlling the CPU operation speed and rotation of the motor fan 21, and the like, an SMI handler for determining the SMI routine to be executed, and the like.

The SMI handler is a program in the BIOS called first by the CPU 11 upon generation of an SMI, and checks the generation factor of the SMI, and calls an SMI routine corresponding to the determined generation factor.

The RTC 15 is a timepiece module having its own operation battery, and has a CMOS memory which always receives a power supply voltage from that battery. The CMOS memory is used for storing, e.g., setup information indicating the system operation environment. The setup information includes two cooling modes, i.e., a "Performance" mode and "Quiet" mode, and one of these modes to be used can be designated by the user.

The "Performance" mode decreases the internal temperature of the system without lowering the operation performance of the CPU 11. In this mode, the rotation/stop timing and rotation speed of the fan 21 are controlled on the basis of the CPU temperature, HDD temperature, and PC card controller ambient temperature respectively detected by temperature sensors A, B, and C.

The "Quiet" mode decreases the amount of heat generated by the CPU 11 without using the motor fan 21 serving as a noise source. In this mode, when the temperature of the CPU 11 rises beyond a predetermined temperature, the operation speed of the CPU 11 is lowered. Such control is done by periodically setting the CPU 11 in the stop grant state to intermittently operate the CPU 11.

This system has a hot key function for switching these modes by predetermined key input operation. Note that the hot key is used for directly requesting of the CPU 11, e.g., various operation mode switching to set/change the system operation environment, and some specific keys on the keyboard are assigned as the hot key. Upon operation of the hot key, some functions associated with setting/changing of the system operation environment provided by the CPU 11 are directly called and executed. An SMI is issued to the CPU 11, and informs the CPU 11 of depression of the hot key. The hot key technique using the SMI is described in, e.g., Japanese Patent Application No. 4-272479 filed by the present applicant.

The power supply controller 16 controls a power supply circuit to supply power supply voltages to the respective units in the system, and incorporates a one-chip microcomputer. The power supply controller 16 performs status management of, e.g., the ON/OFF status of a reset switch and main power switch, the battery remaining capacity, the presence/absence of connection of an AC adapter, ON/OFF status of a display panel open/close detection switch, and the like, and also monitors the temperatures of the CPU 11, HDD 19, and PC card controller 20 using temperature sensors A, B, and C.

In this case, threshold temperatures concordant with the temperature characteristics of the CPU 11, HDD 19, and PC card controller 20 are respectively set in temperature sensors A, B, and C. More specifically, a threshold temperature A2 indicating start of fan rotation and a threshold temperature A1 (A2>A1) indicating stop of fan rotation are assigned to temperature sensor A. Likewise, a threshold temperature B2 indicating start of fan rotation and a threshold temperature B1 (B2>B1) indicating stop of fan rotation are assigned to temperature sensor B, and a threshold temperature C2 indicating start of fan rotation and a threshold temperature C1 (C2>C1) indicating stop of fan rotation are assigned to temperature sensor C. The reason why the fan rotation stop temperature is lower than the fan rotation start temperature is to stop rotation of the fan after sufficient cooling. These fan rotation start and stop temperature values are set in the power supply controller 16 by the IRT routine upon system power ON.

The CPU 11 generates most heat in the system, and the HDD 19 and PC card peripherals come next. For this reason, the relationship among the threshold temperatures satisfies A2>B2>C2 and A1>B1>C1.

The power supply controller 16 always compares the temperatures detected by temperature sensors A, B, and C with the corresponding fan rotation start temperatures A2, B2, and C2 and fan rotation stop temperatures A1, B1, and C1. When the temperature detected by a given temperature sensor has reached the fan rotation start or stop temperature, the controller 16 informs the CPU 11 of that state using the SMI.

In this case, the power supply controller 16 notifies the CPU 11 of information using the SMI in the following procedure.

The following example concerns the temperature of the CPU 11, and temperature sensor A will be taken as an example. When the temperature of the CPU 11 detected by temperature sensor A becomes equal to or higher than A2, or equal to or lower than A1, the power supply controller 16 issues an SMI to the CPU 11. In this case, the power supply controller 16 sets the ID of temperature sensor A and information indicating whether the SMI has arisen from a temperature rise or drop in status registers of the communication gate array 18. Subsequently, the power supply controller 16 sets an SMI generation flag in an SMI generation register of the communication gate array 18. In this manner, the communication gate array 18 generates an SMI (PS-SMI in this case), which is supplied to the CPU 11 via the system controller 12.

The SMI routine reads the temperature sensor ID and temperature rise/drop information from the status registers of the communication gate array 18. Temperature sensor A is identified based on the temperature sensor ID. Whether the SMI has arisen from a temperature rise or drop can be identified based on the temperature rise/drop information. When the SMI has arisen from a temperature rise detected by temperature sensor A, the SMI routine selects cooling method A most suitable for cooling the CPU 11 from cooling methods A, B, and C respectively corresponding to the CPU 11, HDD 19, and PC card controller 20, and rotates the fan 21 at rotational speed defined by the selected cooling method A. The rotational speed of the fan 21 becomes lower in the order of cooling methods A, B, and C.

Even if an SMI is generated based on temperature sensor B during execution of cooling method A, since cooling method A provides more cooling than cooling method B, cooling method A is preferentially executed, and cooling method B is not executed. Cooling method B or C is enabled after the temperature of the CPU 11 detected by temperature sensor A becomes equal to or lower than A1 and cooling method A is released.

Similarly, even if an SMI is generated based on temperature sensor C during execution of cooling method B, cooling method B is preferentially executed, and cooling method C is not executed. Cooling method C is enabled after the temperature of the HDD 19 detected by temperature sensor B becomes equal to or lower than B1 and cooling method B is released.

The keyboard controller 17 controls a standard, built-in keyboard of a computer main body. The controller 17 scans the key matrix of the built-in keyboard to receive a signal corresponding to an ON key event, and converts it into a predetermined key code (scan code). The keyboard controller 17 has two communication ports P1 and P2. The communication port P1 is connected to a system bus 1, and the communication port P2 is connected to the gate array 18.

A key code (e.g., Fn+F2 keys) corresponding to a hot key assigned to the built-in keyboard is sent from the communication port P2 to the gate array 18, and is set in a status register in the gate array 18. In this case, the gate array 18 generates an SMI (hot key SMI), which informs the CPU 11 of the ON event of the hot key.

On the other hand, key codes other than that of the hot key are output onto the system bus 1 via the communication port P1.

The cooling motor fan 21 is an exhaust fan. With this fan, outer air is supplied from an inlet port to an outlet port formed on the computer main body, thus exhausting warm air inside the computer main body to the outside. The rotational speed of the fan 21 is variably controlled by the fan drive control circuit 22 under the control of the CPU 11.

Temperature sensors A, B, and C respectively detect the temperatures around the CPU 11, HDD 19, and the PC card, as described above, and comprise thermistors, and the like.

The hardware arrangement for generation control of the SMI and STPCLK# in the system controller 12 will be explained below.

The system controller 12 comprises a clock generation circuit 121 for supplying external clocks CLK to the CPU 11, an SMI generation circuit 122 for supplying an SMI to the CPU 11, a stop clock control circuit 123 for controlling generation of STPCLK#, a stop clock interval timer 124 for controlling the generation interval of STPCLK#, a stop clock hold timer 125 for controlling the period for holding the CPU 11 in the stop grant state, and a register file 126 allowing the time-out count values of these timers 124 and 125 to be programmable.

In this system, in order to drop the operation speed of the CPU 11, control for alternately repeating the stop grant state and normal state at given time intervals is done. This control will be explained below with reference to FIGS. 3A to 3D.

When the stop clock interval time is set in the register file 126, the stop clock interval timer 124 periodically generates a time-out output at the set time intervals. In response to the time-out output, the stop clock control circuit 123 sets STPCLK# active. The stop clock hold timer 125 generates a time-out output the hold time set in the register file 126 after STPCLK# is set active. In response to this time-out output, the stop clock control circuit 123 resets STPCLK# inactive.

When STPCLK# is set inactive, the CPU 11 executes the grant cycle, and then transits from the normal state to the stop grant state. The stop grant state is maintained until STPCLK# is reset inactive.

Hence, since the CPU 11 alternately repeats the stop grant state and normal state at given time intervals, its average operation speed decreases. In this case, the rate of decrease in operation speed is determined by the ratio between the stop clock internal time and hold time.

The two cooling modes ("Performance" mode, "Quiet" mode) prepared in this system will be described in detail below with reference to FIGS. 4 to 6.

FIG. 4 shows an example of the setup window used in this system.

As shown in FIG. 4, this setup window displays, as setup information for defining the system operation environment, setup information associated with a memory, display, hard disk, I/O port, and password registration, and other setup information (OTHERS). This setup window is provided by the setup routine or the like in the BIOS-ROM, and can be called by a predetermined command input from the keyboard, so that the portable computer can be set in the operation environment set on this setup window.

Other setup information (OTHERS) on the setup window includes a plurality of items for defining the setup state of a battery save mode. In this system, three battery save modes, i.e., full power mode, low power mode, and user setting mode, are available.

(1) The full power mode is an operation mode for high-performance operation, and the environmental setup contents in the full power mode are provided to the user via a window display shown in FIG. 5A. That is, in the full power mode, the processing speed is set at "High", and other items such as a CPU sleep mode and the like are disabled.

In this full power mode, the cooling method is set in the "Performance" mode.

(2) The low power mode is an operation mode for attaining power savings to prolong the battery drive time. The environmental setup contents in the low power mode are provided to the user via a window display shown in FIG. 5B. That is, in the low power mode, the processing speed is set at "Low", and other items such as the CPU sleep mode and the like are enabled.

In this low power mode, the cooling method is set in the "Quiet" mode.

(3) The user setting mode is a mode for defining the operation environment in accordance with respective battery save option information set by the user using a setup program, and the user can set operation states in units of items on a window shown in FIG. 5C. In this case, as for the cooling method, the user can select one of the "Performance" mode and "Quiet" mode.

Figures 6, 7:
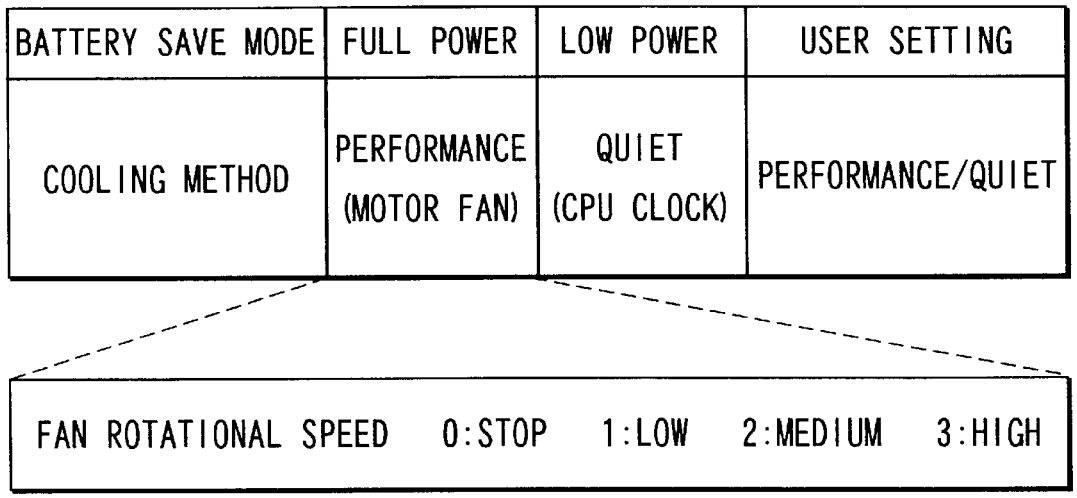
FIG. 6 is a view explaining correspondence among three battery save modes and two cooling methods provided in the first embodiment.
FIG. 7 is a view explaining a relation between temperatures and cooling methods for each device in the first embodiment.

FIG. 6 shows the relationship between these three battery save modes and cooling methods.

As can be seen from FIG. 6, the power save modes and cooling methods link to each other. In the full power mode which is normally used when the AC power supply is being used, the "Performance" mode that gives priority to the CPU speed is used as a cooling method. On the other hand, in the low power mode which is normally used when the computer is being battery-driven, the "Quiet" mode that gives priority to low consumption power is used as a cooling method.

These three modes (full power mode, low power mode, user setting mode) are switched in turn by the above-mentioned hot key operation (Fn+F2) (toggled in the order of full power mode, low power mode, and user setting mode) without using the setup window.

The cooling operations in the "Performance" mode and "Quiet" mode will be explained below.

(1) The "Quiet" mode is a mode for cooling the system without using the motor fan 21 that becomes a noise source, and the operation speed of the CPU 11 is controlled on the basis of the temperature of the CPU 11 detected by temperature sensor A. In this case, the above-mentioned threshold temperature A2 is used as a temperature for issuing an SMI indicating a CPU operation speed down request, and A1 is used as a temperature for issuing an SMI indicating a CPU operation speed up request.

(2) In the "Performance" mode, cooling is done using the motor fan 21. In this case, the rotational speed of the motor fan 21 is variably set in the following four steps.

0: Stop
1: Low
2: Medium
3: High

The rotational speed used is determined by the temperature sensor ID as an SMI generation factor, as described above.

FIG. 7 shows the relationship among the threshold temperatures respectively set in temperature sensors A, B, and C, cooling methods to be executed, and rotational speeds of the motor fan 21.

As can be seen from FIG. 7, when temperature sensor A detects that the CPU temperature has exceeded the threshold temperature A2, cooling method A suitable for the temperature characteristics of the CPU 11 is executed. In this case, the rotational speed of the motor fan 21 is set at fan=3, i.e., "high". Cooling method A is released when temperature sensor A detects that the CPU temperature has become equal to or lower than the threshold temperature A1. In this case, the rotational speed of the motor fan 21 is set at fan=0, i.e., "stop".

Likewise, when temperature sensor B detects that the HDD temperature has exceeded the threshold temperature B2, cooling method B suitable for the temperature characteristics of the HDD 19 is executed. In this case, the rotational speed of the motor fan 21 is set at fan=2, i.e., "medium". Cooling method B is released when the temperature sensor B detects that the HDD temperature has become equal to or lower than the threshold temperature B1. In this case, the rotational speed of the motor fan 21 is set at fan=0, i.e., "stop".

On the other hand, when temperature sensor C detects that the PC card ambient temperature has exceeded the threshold temperature C2, cooling method C suitable for the temperature characteristics of the PC card controller and its peripheral circuits is executed. In this case, the rotational speed of the motor fan 21 is set at fan=1, i.e., "low". Cooling method C is released when temperature sensor C detects that the PC 5 card ambient temperature has become equal to or lower than the threshold temperature C1. In this case, the rotational speed of the motor fan 21 is set at fan=0, i.e., "stop".

Figure 8A:
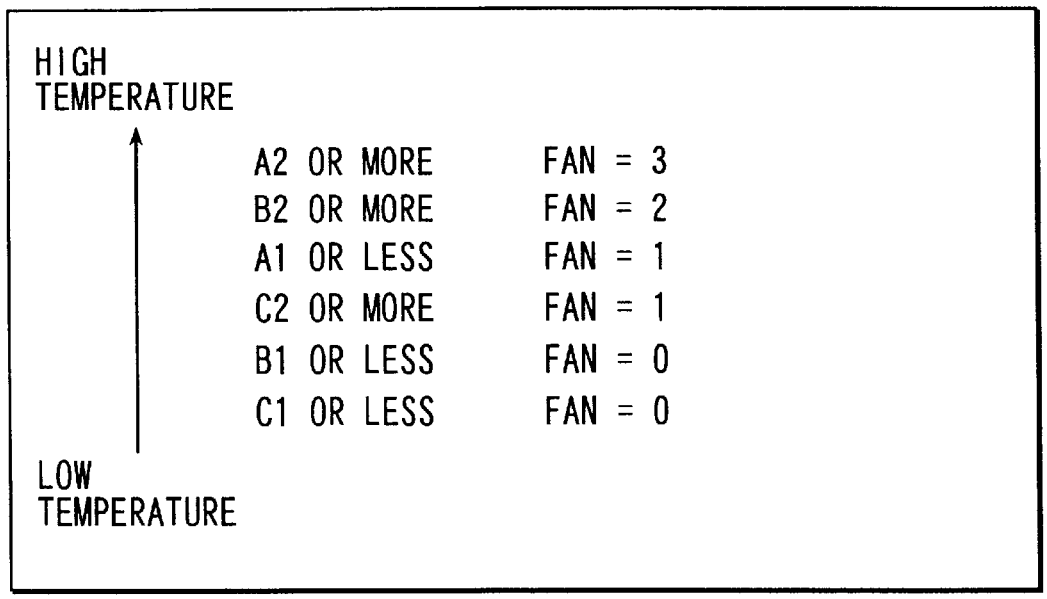
FIGS. 8A and 8B are views showing states of change of the fan rotational speed in the first embodiment.
Figure 8B:
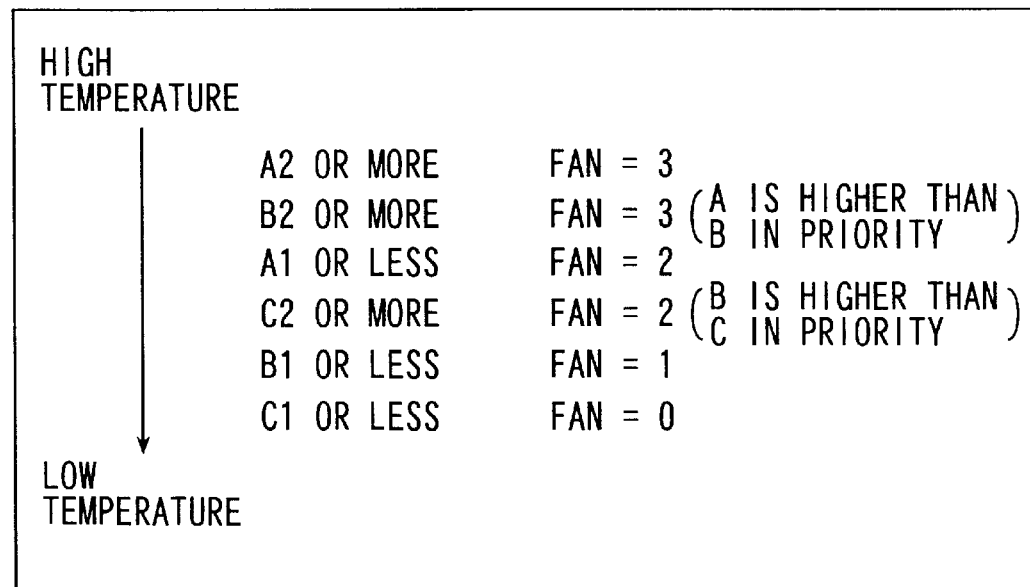

FIGS. 8A and 8B respectively show changes in fan rotational speed upon temperature rise and fall in the system.

Assume that the threshold temperatures satisfy:

A2>B2>A1>C2>B1>C1

In this case, if the temperatures around the devices to be subjected to temperature detection become equal to or higher than C2, B2, and A2 in the order of temperature sensors C, B, and A, the fan rotational speed increases stepwise in the order of fan=0, 1, 2, and 3, as shown in FIG. 8A.

On the other hand, upon temperature fall of the individual devices, the fan rotational speed changes in principle, as shown in FIG. 8B. That is, since cooling of fan=3 (cooling method A) is higher than cooling method B (fan=2) in priority, once cooling method A is executed, it is not switched to other cooling methods until the CPU temperature becomes equal to or lower than A1. Similarly, since cooling of fan=2 (cooling method B) is higher than cooling method C (fan=1) in priority, once cooling method B is executed, it is not switched to cooling method C until the HDD temperature becomes equal to or lower than B1.

FIG. 9 shows the second example of cooling control in the "Performance" mode.

In FIG. 9, when the CPU temperature becomes equal to or higher than the threshold temperature A2, cooling (fan=3) using the motor fan 21 and CPU operation speed down control (low) are combined; when the HDD temperature becomes equal to or higher than the threshold temperature B2, and when the PC card ambient temperature becomes equal to or higher than the threshold temperature C2, cooling is done by controlling only the motor fan 21 as in the above example. With this control, when the CPU 11 is overheated, the most efficient cooling method can be adopted, and the CPU 11 can be cooled quickly. FIGS. 10A and 10B show changes in fan rotational speed upon temperature rise and fall in the system as a result of the cooling control shown in FIG. 9.

The cooling control procedure in the "Performance" mode executed by the SMI routine will be described below with reference to the flow chart in FIG. 11.

When the SMI routine is started in response to an SMI supplied from the power supply controller 16, it reads the temperature sensor ID and temperature rise/fall information from the status registers in the communication gate array 18 (step S101).

The SMI routine checks based on the read temperature sensor ID if the SMI is generated based on temperature sensor A (step S102). If Y (YES) in step S102, it is checked if the SMI has arisen from a temperature rise or fall (step S103). If the SMI is generated upon detecting a temperature rise by temperature sensor A, the SMI routine sets cooling method A (fan=3, or fan=3 and CPU=low) (step S104). On the other hand, if the SMI is generated upon detecting a temperature fall by temperature sensor A, the SMI routine releases cooling method A (fan=0, or fan=0 and CPU=high) (step S105).

On the other hand, if the SMI does not arise from temperature sensor A, it is checked if cooling method A is in execution (step S106). If Y in step S106, the SMI routine ends at that time. In this way, during execution of cooling method A, switching to cooling method B or C is inhibited.

If N (NO) in step S106, it is checked based on the temperature sensor ID read in step S101 if the SMI is generated based on temperature sensor B (step S107). If Y in step S107, it is checked if the SMI has arisen from a temperature rise or fall (step S108). If the SMI is generated upon detecting a temperature rise by temperature sensor B, the SMI routine sets cooling method B (fan=2) (step S109). On the other hand, if the SMI is generated upon detecting a temperature fall by temperature sensor B, the SMI routine releases cooling method B (fan=0) (step S110).

If the SMI does not arise from temperature sensor B, it is checked if cooling method B is in execution (step S111). If Y in step S111, the SMI routine ends at that time. With this control, during execution of cooling method B, switching to cooling method C is inhibited (but switching to cooling method A is permitted).

On the other hand, if N in step S111, it is checked based on the temperature sensor ID read in step S101 if the SMI is generated based on temperature sensor C (step S112). If Y in step S112, it is checked if the SMI has arisen from a temperature rise or fall (step S113). If the SMI is generated upon detecting a temperature rise by temperature sensor C, the SMI routine sets cooling method C (fan=1) (step S114). On the other hand, if the SMI is generated upon detecting a temperature fall by temperature sensor C, the SMI routine releases cooling method C (fan=0) (step S115).

Figure 11:
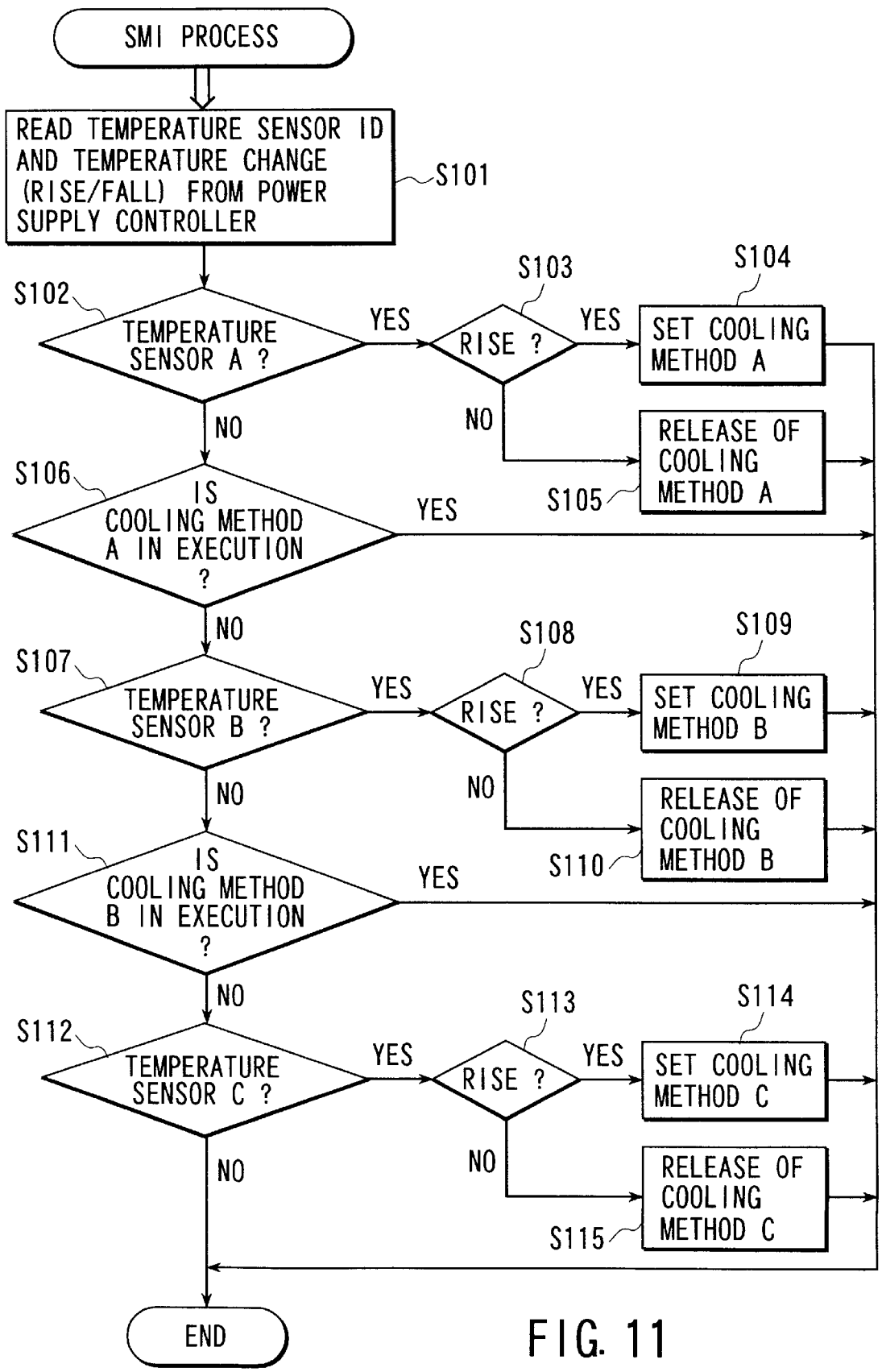
FIG. 11 is a flowchart explaining a procedure of a cooling control process in the first embodiment.
Figure 12:
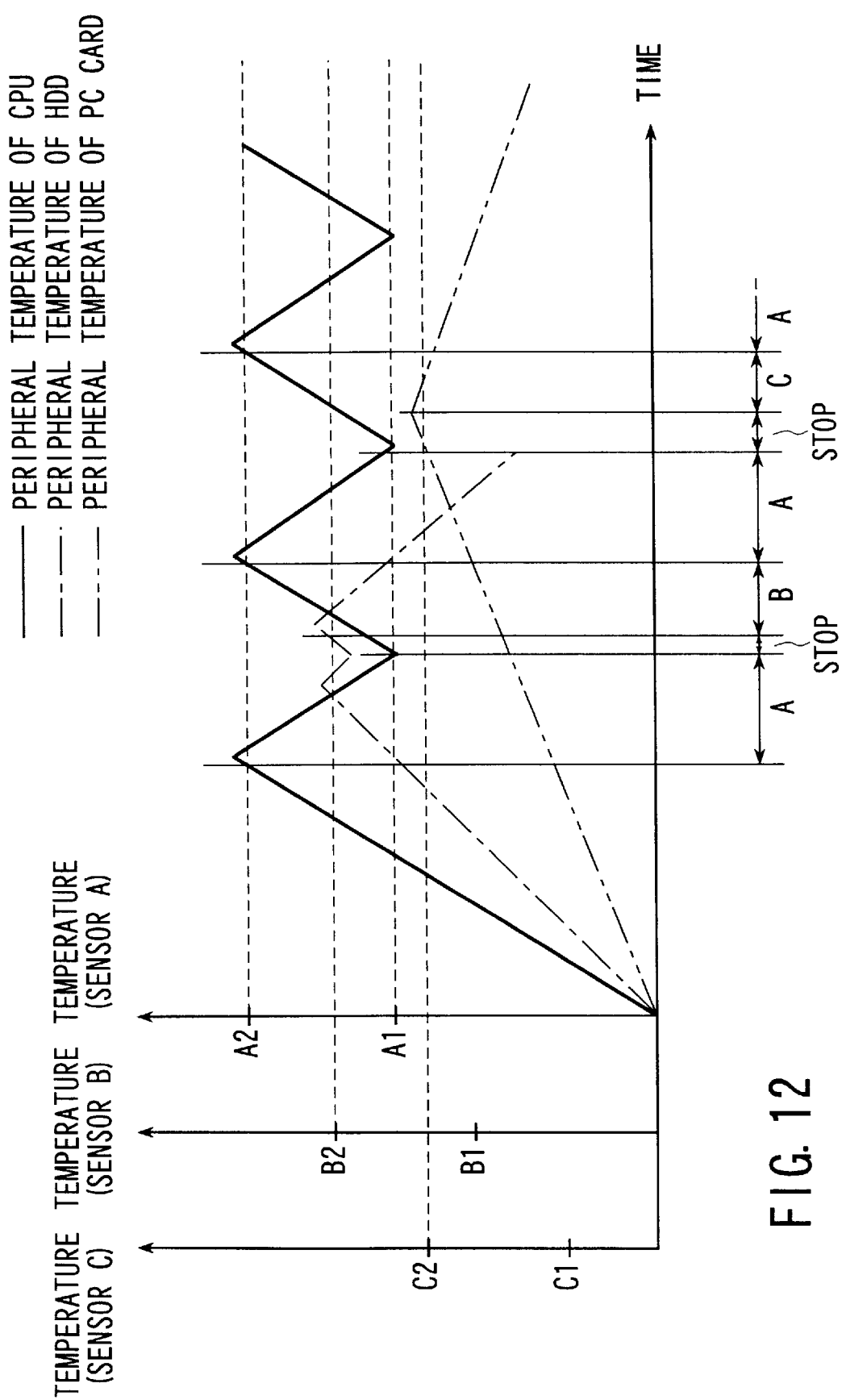
FIG. 12 is a view showing states of temperature change of each device when the cooling control process shown in FIG. 11 is executed.

FIG. 12 shows an example of changes in temperature in the system when the cooling control shown in FIG. 11 is done.

In FIG. 12, the solid curve indicates the CPU temperature; the one-dashed chain curve, HDD temperature; and the double-dashed chain curve, the PC card ambient temperature. In FIG. 12, for the sake of simplicity, the correlation among the CPU temperature, HDD temperature, and PC card ambient temperature is ignored.

In the example shown in FIG. 12, when the CPU temperature reaches the threshold temperature A2, cooling based on cooling method A is started. During cooling based on cooling method A, the HDD temperature reaches B2, but cooling based on cooling method A is maintained. When the CPU temperature becomes equal to or lower than the threshold temperature A1, cooling method A is released. After that, when the HDD temperature reaches B2, cooling based on cooling method B is started. When the CPU temperature reaches the threshold temperature A2 again during cooling based on cooling method B, cooling method B is switched to cooling method A.

As described above, according to the first embodiment, temperature sensors A, B, and C are respectively arranged in the vicinity of the CPU 11, HDD 19, and PC card controller 20, and are respectively assigned threshold temperatures and cooling methods in correspondence with the CPU 11, HDD 19, and PC card controller 20, thus cooling the device that must be cooled at an appropriate fan rotational speed.

Hence, the HDD 19 and PC card peripheries can be cooled without making any conventional control for setting the CPU temperature corresponding to the fan rotation start temperature to be lower than that originally determined by the temperature characteristics of the CPU. In this fashion, measures against overheating of the individual devices can be taken without wastefully rotating the motor fan 21.

The second embodiment of the present invention will be described below.

Figure 13:
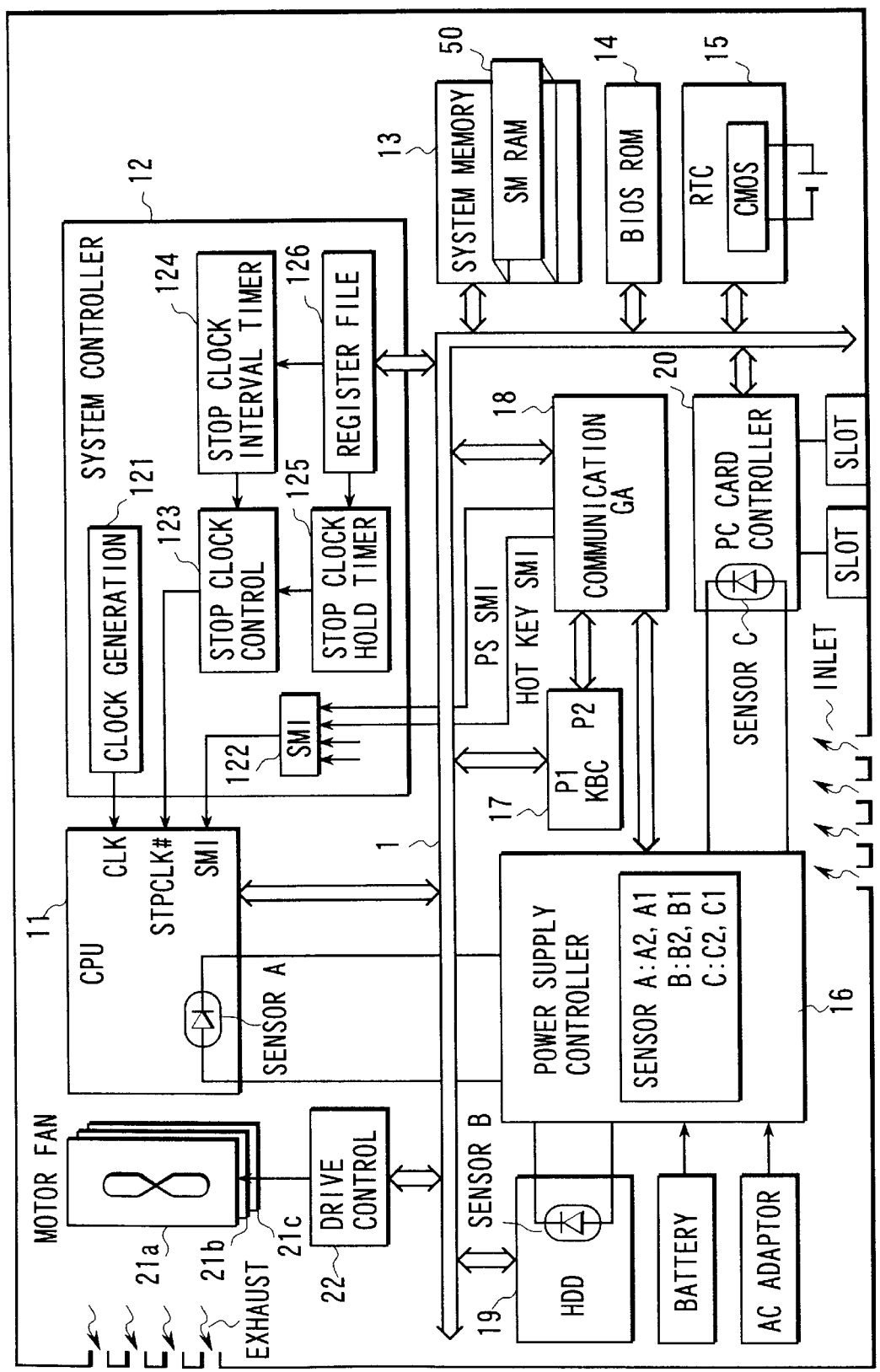
FIG. 13 is a block diagram showing an arrangement of a computer system according to a second embodiment of the present invention.

FIG. 13 shows the system arrangement of a personal computer according to the second embodiment of the present invention.

This system comprises three cooling motor fans 21a, 21b, and 21c, and the number of fans to be driven concurrently is variably controlled in place of the multi-stage fan rotational speed control in the first embodiment.

More specifically, temperature sensors A, B, and C are respectively arranged in the vicinity of the CPU 11, HDD 19, and PC card controller 20, and are assigned different threshold temperatures and cooling methods in correspondence with the CPU 11, HDD 19, and PC card controller 20 as in the first embodiment, but the cooling power suitable for the device to be cooled is set by variably controlling the number of fans to be driven concurrently.

Cooling operations in the "Performance" mode and "Quiet" mode in the second embodiment will be explained below with reference to FIG. 14.

(1) The "Quiet" mode cools the system without using the motor fans 21a, 21b, and 21c as noise sources, and controls the operation speed of the CPU 11 on the basis of the temperature of the CPU 11 detected by temperature sensor A as in the first embodiment. In this case, the above-mentioned threshold temperature A2 is used as a temperature for issuing an SMI indicating a CPU operation speed down request, and A1 is used as a temperature for issuing an SMI indicating a CPU operation speed up request.

(2) In the "Performance" mode, cooling is done by selectively using the motor fans 21a, 21b, and 21c. In this case, the number of motor fans to be driven concurrently is variably set in four steps as follows:

0: All fans are stopped
1: Operation of single fan
2: Operation of two fans
3: Operation of three fans The number of motor fans to be driven concurrently is determined on the basis of the temperature sensor ID or the like as an SMI generation factor.

FIG. 15 shows the correspondence among the threshold temperatures respectively set in temperature sensors A, B, and C, the cooling methods to be executed, and the number of motor fans to be driven concurrently.

As can be understood from FIG. 15, when temperature sensor A detects that the CPU temperature has exceeded the threshold temperature A2, cooling method A suitable for the temperature characteristics of the CPU 11 is executed. In this case, the number of fans to be driven concurrently is set at fan=3, i.e., "operation of three fans". Cooling method A is released when temperature sensor A detects that the CPU temperature has become equal to or lower than the threshold temperature A1. In this case, the number of fans to be driven concurrently is set at fan=0, i.e., "all fans are stopped".

Likewise, when temperature sensor B detects that the HDD temperature has exceeded the threshold temperature B2, cooling method B suitable for the temperature characteristics of the HDD 19 is executed. In this case, the number of fans to be driven concurrently is set at fan=2, i.e., "operation of two fans". Cooling method B is released when temperature sensor B detects that the HDD temperature has become equal to or lower than the threshold temperature B1. In this case, the number of fans to be driven concurrently is set at fan=0, i.e., "all fans are stopped".

On the other hand, when temperature sensor C detects that the PC card ambient temperature has exceeded the threshold temperature C2, cooling method C suitable for the temperature characteristics around the PC card controller is executed. In this case, the number of fans to be driven concurrently is set at fan=1, i.e., "operation of single fan". Cooling method C is released when temperature sensor C detects that the PC card ambient temperature has become equal to or lower than the threshold temperature C1. In this case, the number of fans to be driven concurrently is set at fan=0, i.e., "all fans are stopped".

The threshold temperatures satisfy:

A2>B2>A1>C2>B1>C1

In this case, if the temperatures around the devices to be subjected to temperature detection become equal to or higher than C2, B2, and A2 in the order of temperature sensors C, B, and A, the number of fans to be driven concurrently increases stepwise in the order of fan=0, 1, 2, and 3.

On the other hand, upon detecting a temperature fall of each device, since cooling of fan=3 (cooling method A) is higher than cooling method B (fan=2) in priority, once cooling method A is executed, it is not switched to other cooling methods until the CPU temperature becomes equal to or lower than A1. Similarly, since cooling of fan=2 (cooling method B) is higher than cooling method C (fan=1) in priority, once cooling method B is executed, it is not switched to cooling method C until the HDD temperature becomes equal to or lower than B1.

FIG. 16 shows the second example of cooling control in the "Performance" mode.

In FIG. 16, when the CPU temperature becomes equal to or higher than the threshold temperature A2, cooling (fan=3) using the motor fans 21a, 21b, and 21c and CPU operation speed down control (low) are combined; when the HDD temperature becomes equal to or higher than the threshold temperature B2, and when the PC card ambient temperature becomes equal to or higher than the threshold temperature C2, cooling is done by controlling only the number of motor fans to be driven as in the above example. With this control, when the CPU 11 is overheated, the most efficient cooling method can be adopted, and the CPU 11 can be cooled quickly.

The third embodiment of the present invention will be described below.

Figure 17:
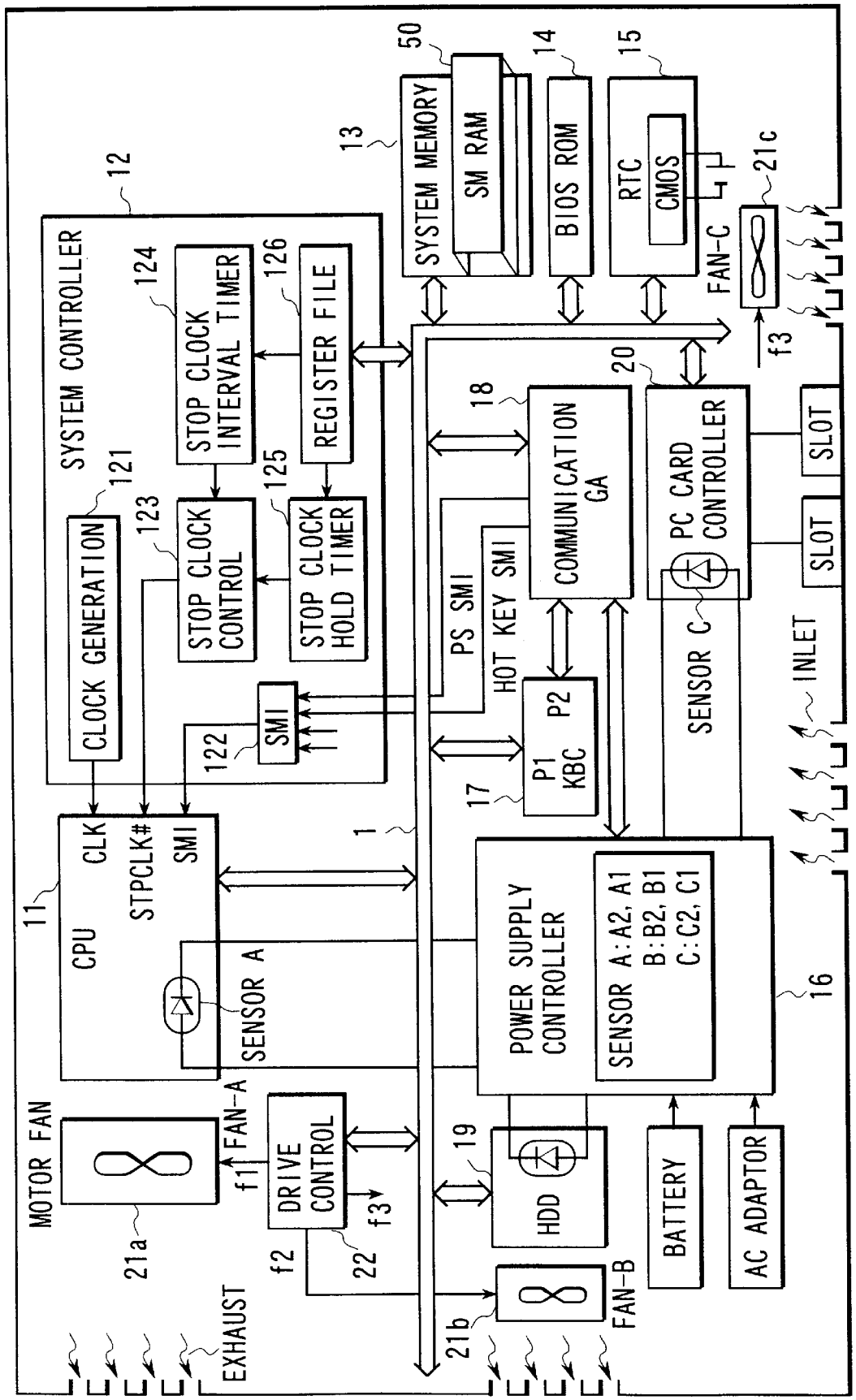
FIG. 17 is a block diagram showing an arrangement of a computer system according to a third embodiment of the present invention.

FIG. 17 shows the system arrangement of a personal computer according to the third embodiment of the present invention.

In this system, three cooling motor fans 21a, 21b, and 21c are respectively arranged adjacent to the CPU 11, HDD 19, and PC card controller 20, and the fan corresponding to the device to be cooled is controlled.

More specifically, when temperature sensor A detects that the CPU 11 must be cooled, the fan 21a is rotated. Similarly, when temperature sensor B detects that the HDD 19 must be cooled, the fan 21b is rotated. When temperature sensor C detects that the PC card peripheries must be cooled, the fan 21c is rotated. In this manner, by changing the fans to be driven in units of devices to be cooled, optimal cooling can be done in units of devices.

Cooling operations in the "Performance" mode and "Quiet" mode in the third embodiment will be explained below with reference to FIG. 18.

(1) The "Quiet" mode cools the system without using the motor fans 21a, 21b, and 21c as noise sources, and controls the operation speed of the CPU 11 on the basis of the temperature of the CPU 11 detected by temperature sensor A as in the first embodiment. In this case, the above-mentioned threshold temperature A2 is used as a temperature for issuing an SMI indicating a CPU operation speed down request, and A1 is used as a temperature for issuing an SMI indicating a CPU operation speed up request.

(2) In the "Performance" mode, cooling is done by selectively using the motor fans 21a, 21b, and 21c. In this case, the motor fan 21a (FAN-A), 21b (FAN-B), and 21c (FAN-C) are respectively subjected to the following ON/OFF operation control:

FAN-A 0: stop, 1: operation
FAN-B 0: stop, 1: operation
FAN-C 0: stop, 1: operation The fan to be ON/OFF-controlled is determined based on the temperature sensor ID or the like as an SMI generation factor.

FIG. 19 shows the relationship among the threshold temperatures respectively set in temperature sensors A, B, and C, the cooling methods to be executed, and the motor fans to be ON/OFF-controlled.

As can be seen from FIG. 19, when temperature sensor A detects that the CPU temperature has exceeded the threshold temperature A2, cooling method A suitable for the temperature characteristics of the CPU 11 is executed. In this case, fan control is set at FAN-A=1, i.e., "operation" state of FAN-A. Cooling method A is released when temperature sensor A detects that the CPU temperature has become equal to or lower than the threshold temperature A1. In this case, fan control is set at FAN-A=0, i.e., "stop" state.

Likewise, when temperature sensor B detects that the HDD temperature has exceeded the threshold temperature B2, cooling method B suitable for the temperature characteristics of the HDD 19 is executed. In this case, fan control is set at FAN-B=1, i.e., "operation" state of FAN-B. Cooling method B is released when temperature sensor B detects that the HDD temperature has become equal to or lower than the threshold temperature B1. In this case, fan control is set at FAN-B=0, i.e., "stop" state.

On the other hand, when temperature sensor C detects that the PC card ambient temperature has exceeded the threshold temperature C2, cooling method C suitable for the temperature characteristics around the PC card controller is executed. In this case, fan control is set at FAN-B=1, i.e., "operation" state of FAN-B. Cooling method C is released when temperature sensor C detects that the PC card ambient temperature has become equal to or lower than the threshold temperature C1. In this case, fan control is set at FAN-B=0, i.e., "stop" state.

The threshold temperatures satisfy:

A2>B2>A1>C2>B1>C1

In this case, if the temperatures around the devices to be subjected to temperature detection become equal to or higher than C2, B2, and A2 in the order of temperature sensors C, B, and A, the fans are set in the operation state in the order of fan 21c (FAN-C), 21b (FAN-B), and 21a (FAN-B).

On the other hand, upon detecting a temperature fall of each device, the cooling methods have no priority, and when it is detected that the device temperature has become equal to or lower than the fan rotation stop temperature, the operation of the corresponding fan is stopped.

FIG. 20 shows the second example of the cooling control in the "Performance" mode of the third embodiment.

In FIG. 20, when the CPU temperature becomes equal to or higher than the threshold temperature A2, cooling (FAN-A=1) using the motor fan 21a and CPU operation speed down control (low) are combined; when the HDD temperature becomes equal to or higher than the threshold temperature B2, and when the PC card ambient temperature becomes equal to or higher than the threshold temperature C2, cooling is done by controlling only the number of motor fans to be driven as in the above example. With this control, when the CPU 11 is overheated, the most efficient cooling method can be adopted, and the CPU 11 can be cooled quickly.

As described above, in the first to third embodiments, since the ambient temperatures are managed in units of devices using a plurality of temperature sensors A, B, and C, an optimal cooling method (the fan rotational speed, the number of fans to be driven concurrently, selection of the fan to be used, a combination of fan control and CPU operation speed control) corresponding to the overheated device can be selected, thus efficiently executing cooling with lower noise and lower consumption power.

In the above description, the threshold temperature values are permanently determined for temperature sensors A, B, and C. Preferably, a user interface for allowing the user to change these threshold temperature values is provided. This user interface will be explained below with reference to FIGS. 21 and 22.

FIG. 21 shows the contents of environment setup information in the full power mode provided by the setup window. This window corresponds to that shown in FIG. 5A, and a cooling level menu is added in FIG. 21. This menu is used for changing the cooling start temperature in units of devices to be cooled. In "Normal" mode, default threshold temperatures (A2, A1, B2, B1, C2, and C1) of the system are used. When the user changes the cooling level menu to "User" on the window, a cooling level menu setup window shown in FIG. 22 appears.

As shown in FIG. 22, the cooling level menu window displays three scales for respectively adjusting the CPU cooling start temperature, HDD cooling start temperature, and PC card peripheral cooling start temperature. The cursor position on each scale is set at the right end position in the Normal mode. This cursor position indicates the default cooling start temperature defined in the system. The default cooling start temperature value is set at the highest level, i.e., a maximum value within system operation guaranteed range.

When the user moves the cursor to the left, he or she can re-set the cooling start temperature of each device at a value lower than the system default. However, the user cannot set each temperature at a value higher than the system default. This is because if the user's value is set to be higher than the system default, the system operation cannot often be guaranteed.

For example, when the user moves the cursor on the CPU cooling start temperature adjustment scale to the left by, e.g., dragging a mouse, the threshold value (A2) indicating that cooling start temperature decreases. With this change in value A2, the value A1 is automatically changed to maintain a relation A2>A1.

When the cursor on the CPU cooling start temperature adjustment scale is moved to the left end position, a maximum cooling mode in which all the fans are kept rotated irrespective of the actual CPU temperature is set. In this case, in the first embodiment using a single fan, the fan 21 is rotated at a maximum rotational speed irrespective of the temperatures detected by the temperature sensors A, B, and C.

The contents of the cooling levels changed on the cooling level menu setup window are reflected in the power supply controller 16. Then, subsequent generation of SMIs is controlled in accordance with the changed cooling levels.

Figure 23:
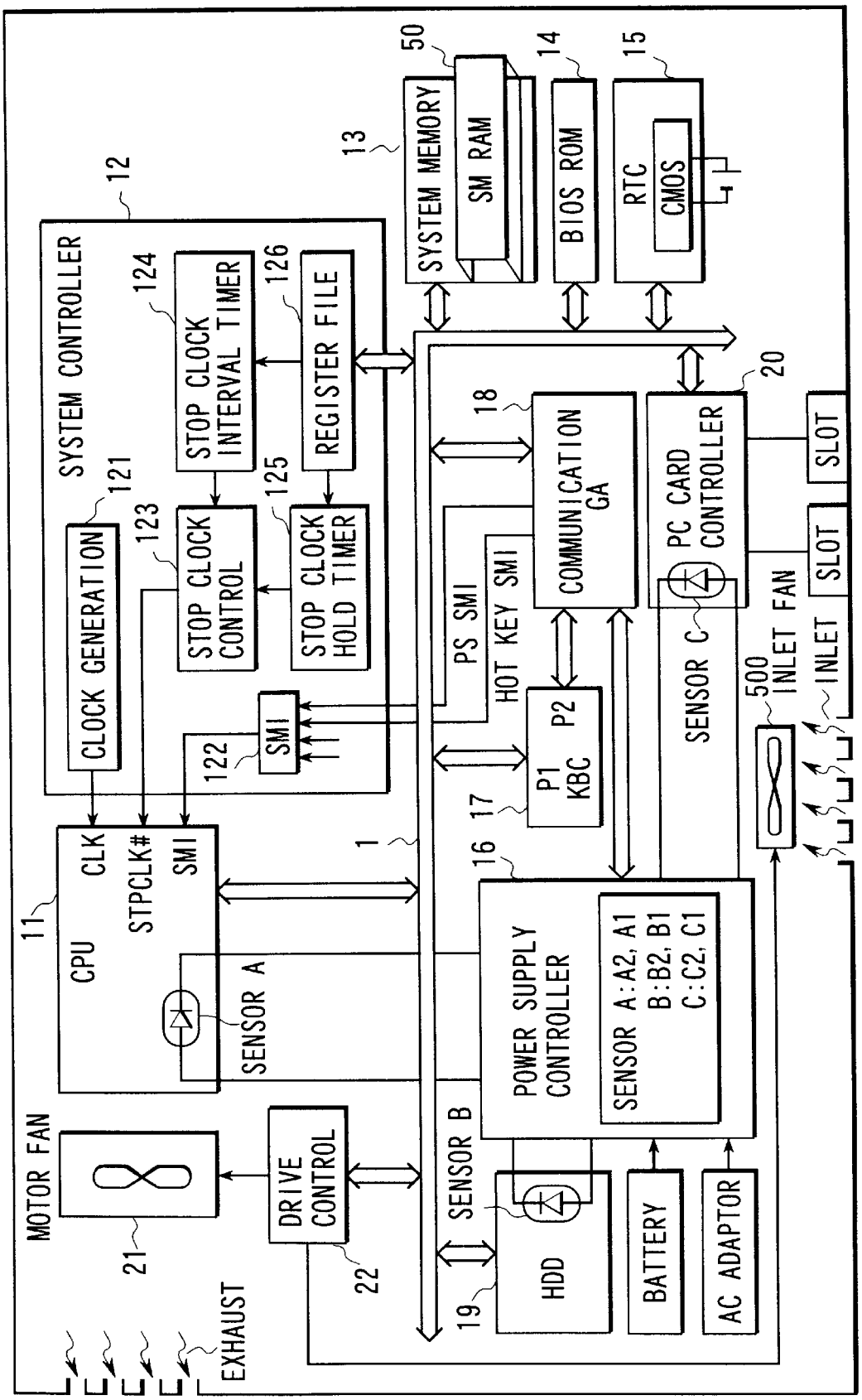
FIG. 23 is a view explaining inlet structure used in each device of the present invention.
Figure 24:
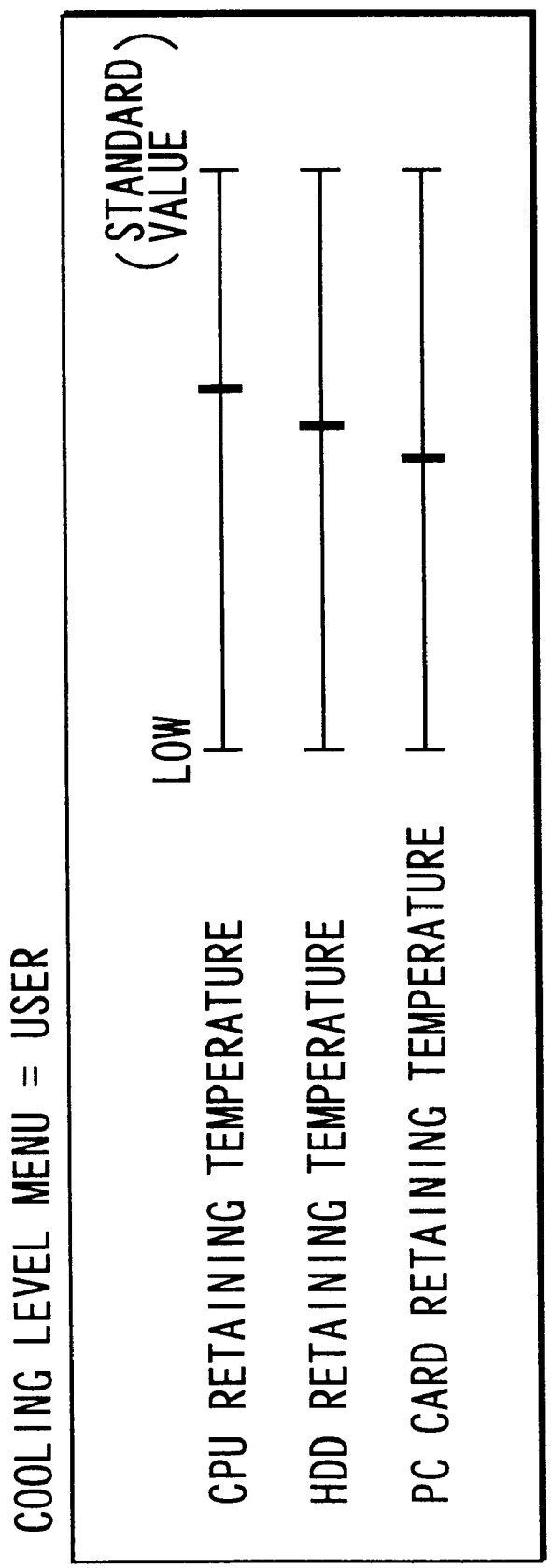
FIG. 24 is a view showing a modification of the cooling level setting window shown in FIG. 22.

FIG. 23 shows a modification of an inlet mechanism of the system of the first embodiment.

In this modification, an inlet motor fan 500 is added at a position neighboring an inlet formed on the computer main body. By rotating the motor fan 500, air circulation efficiency can be improved, and high-power cooling can be realized. For example, this motor fan 500 is rotated in cooling method A described above, and is stopped in cooling method B or C. Hence, when the CPU temperature becomes too high and high-power cooling is required, the CPU temperature can be immediately dropped. Such cooling control in cooperation with the inlet fan 500 can also be applied to the second and third embodiments. In this case, in the third embodiment, the inlet fan 500 can be ON/OFF-controlled in cooperation with the ON/OFF state of the CPU cooling fan 21*a*.

When one of cooling methods A, B, and C is in execution, the inlet fan 500 may be rotated, and when none of these cooling methods are executed, the inlet fan 500 may be stopped.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer system comprising:

a first device to be cooled;

a second device to be cooled, said second device being different from said first device;

a cooling fan having variable rotational speed;

a first temperature sensor which is arranged to detect a first temperature related to said first device;

a second temperature sensor which is arranged to detect a second temperature related to said second device; and fan control means for changing a rotational speed of said cooling fan, based on at least one of the first temperature detected by said first temperature sensor and the second temperature detected by said second temperature sensor, wherein said fan control means changes the rotational speed of said cooling fan when said first temperature sensor detects the first temperature has become not less than a first threshold temperature, and when said second temperature sensor detects that the second temperature has become not less than a second threshold temperature.

2. A computer system comprising:

a first device to be cooled;

a second device to be cooled, said second device being different from said first device;

a cooling fan having variable rotational speed;

a first temperature sensor which is arranged to detect a first temperature related to said first device;

a second temperature sensor which is arranged to detect a second temperature related to said second device; and fan control means for changing a rotational speed of said cooling fan, based on at least one of the first temperature detected by said first temperature sensor and the second temperature detected by said second temperature sensor, wherein said fan control means changes the rotational speed of said cooling fan when said first temperature sensor detects the first temperature has become not less than a first threshold temperature, and when said second temperature sensor detects that the second temperature has become not less than a second threshold temperature, and wherein at least one of said and first and second threshold temperatures is changeable by a user.

3. A computer system comprising:
a first device to be cooled;
a second device to be cooled, said second device being different from said first device;
a cooling fan having variable rotational speed;
a first temperature sensor which is arranged to detect a first temperature related to said first device;
a second temperature sensor which is arranged to detect a second temperature related to said second device; and
fan control means for changing a rotational speed of said cooling fan, based on at least one of the first temperature detected by said first temperature sensor and the second temperature detected by said second temperature sensor, wherein said fan control means changes the rotational speed of said cooling fan when said first temperature sensor detects the first temperature has become not less than a first threshold temperature, and when said second temperature sensor detects that the second temperature has become not less than a second threshold temperature, wherein said fan control means also changes the rotational speed of said cooling fan, based on whether or not the first temperature detected by said first temperature sensor has become less than a third threshold temperature and whether or not the second temperature detected by said second temperature sensor has become less than a fourth threshold temperature, and the third threshold temperature is less than the first threshold temperature and the fourth threshold temperature is less than the second threshold temperature.

4. A computer system comprising:
a first device to be cooled;
a second device to be cooled, said second device being different from said first device;
a cooling fan having variable rotational speed;
a first temperature sensor which is arranged to detect a first temperature related to said first device;
a second temperature sensor which is arranged to detect a second temperature related to said second device; and
fan control means for changing a rotational speed of said cooling fan, based on at least one of the first temperature detected by said first temperature sensor and the second temperature detected by said second temperature sensor, wherein said fan control means changes the rotational speed of said cooling fan when said first temperature sensor detects the first temperature has become not less than a first threshold temperature, and when said second temperature sensor detects that the second temperature has become not less than a second threshold temperature, and wherein said fan control means controls to rotate said cooling fan at a first rotational speed while the first temperature detected by said first temperature sensor is not less than the first threshold temperature, and said fan control means controls to rotate said cooling fan at a second rotational speed while the second temperature detected by said second temperature sensor is not less than the second threshold temperature and the first temperature detected by said first temperature sensor is less than the first threshold temperature.

5. A computer system comprising:
a first device to be cooled;
a second device to be cooled, said second device being different from said first device;
a cooling fan having variable rotational speed;
a first temperature sensor which is arranged to detect a first temperature related to said first device;
a second temperature sensor which is arranged to detect a second temperature related to said second device; and
fan control means for changing a rotational speed of said cooling fan, based on at least one of the first temperature detected by said first temperature sensor and the second temperature detected by said second temperature sensor, wherein said fan control means changes the rotational speed of said cooling fan when said first temperature sensor detects the first temperature has become not less than a first threshold temperature, and when said second temperature sensor detects that the second temperature has become not less than a second threshold temperature, and wherein said first device is a CPU, and said system further comprises means for decreasing an operation speed of the CPU when the first temperature detected by said first temperature sensor has become not less than the first threshold temperature.

6. The system according to claim 5, further comprising means for, when the temperature detected by said first temperature sensor has become not less than the first threshold temperature, controlling to selectively one of i) decreasing the operation speed of the CPU and ii) increasing the rotational speed of said cooling fan.

7. A computer system comprising:
a first device to be cooled;
a second device to be cooled, said second device being different from said first device;
a cooling fan having variable rotational speed;
a first temperature sensor which is arranged to detect a first temperature related to said first device;
a second temperature sensor which is arranged to detect a second temperature related to said second device; and
fan control means for changing a rotational speed of said cooling fan, based on at least one of the first temperature detected by said first temperature sensor and the second temperature detected by said second temperature sensor, wherein said fan control means changes the rotational speed of said cooling fan when said first temperature sensor detects the first temperature has become not less than a first threshold temperature, and when said second temperature sensor detects that the second temperature has become not less than a second threshold temperature, wherein said fan control means includes:
means for, when the first temperature detected by said first temperature sensor is not less than the first threshold temperature, informing a CPU of said computer system of a temperature sensor ID indicating said first temperature sensor using an interrupt signal, and means for, when the second temperature detected by said second temperature sensor is not less than the second threshold temperature, informing the CPU of said computer system of a temperature sensor ID indicating said second temperature sensor using an interrupt signal, and wherein the CPU determines the rotational speed of said cooling fan on the basis of the informed temperature sensor ID.

8. A computer system comprising:

a first device to be cooled;

a second device to be cooled, said second device being different from said first device;

a cooling fan having variable rotational speed, wherein said cooling fan is an exhaust fan for exhausting air outside said computer system that accommodates the first and second devices, and said system further comprises an inlet fan for taking outer air into said computer system;

a first temperature sensor which is arranged to detect a first temperature related to said first device;

a second temperature sensor which is arranged to detect a second temperature related to said second device; and fan control means for changing a rotational speed of said cooling fan, based on at least one of the first temperature detected by said first temperature sensor and the second temperature detected by said second temperature sensor, wherein said fan control means changes the rotational speed of said cooling fan when said first temperature sensor detects the first temperature has become not less than a first threshold temperature, and when said second temperature sensor detects that the second temperature has become not less than a second threshold temperature.

9. A computer system comprising:

a first device to be cooled;

a second device to be cooled, said second device being different from said first device;

a plurality of cooling fans;

a first temperature sensor which is arranged to detect a first temperature related to said first device;

a second temperature sensor which is arranged to detect a second temperature related to said second device; and fan control means for changing a number of cooling fans to be driven, based on at least one of the first temperature detected by said first temperature sensor and the second temperature detected by said second temperature sensor, wherein said fan control means changes a number of cooling fans to be driven when said first temperature sensor detects the first temperature has become not less than a first threshold temperature, and when said second temperature sensor detects that the second temperature has become not less than a second threshold temperature.

10. A computer system comprising:

a first device to be cooled;

a second device to be cooled, said second device being different from said first device;

a plurality of cooling fans;

a first temperature sensor which is arranged to detect a first temperature related to said first device;

a second temperature sensor which is arranged to detect a second temperature related to said second device; and fan control means for changing a number of cooling fans to be driven, based on at least one of the first temperature detected by said first temperature sensor and the second temperature detected by said second temperature sensor, wherein said fan control means changes a number of cooling fans to be driven when said first temperature sensor detects the first temperature has become not less than a first threshold temperature, and when said second temperature sensor detects that the second temperature has become not less than a second threshold temperature, and wherein at least one of said first and second threshold temperatures is changeable by a user.

11. A computer system comprising:

a first device to be cooled;

a second device to be cooled, said second device being different from said first device;

a plurality of cooling fans;

a first temperature sensor which is arranged to detect a first temperature related to said first device;

a second temperature sensor which is arranged to detect a second temperature related to said second device; and fan control means for changing a number of cooling fans to be driven, based on at least one of the first temperature detected by said first temperature sensor and the second temperature detected by said second temperature sensor, wherein said fan control means changes a number of cooling fans to be driven when said first temperature sensor detects the first temperature has become not less than a first threshold temperature, and when said second temperature sensor detects that the second temperature has become not less than a second threshold temperature, and wherein said fan control means also changes the number of cooling fans, based on whether or not the first temperature detected by said first temperature sensor has become less than a third threshold temperature and whether or not the second temperature detected by said second temperature sensor has become less than a fourth threshold temperature, and the third threshold temperature is less than the first threshold temperature and the fourth threshold temperature is less than the second threshold temperature.

12. A computer system comprising:

a first device to be cooled;

a second device to be cooled, said second device being different from said first device;

a plurality of cooling fans;

a first temperature sensor which is arranged to detect a first temperature related to said first device;

a second temperature sensor which is arranged to detect a second temperature related to said second device; and fan control means for changing a number of cooling fans to be driven, based on at least one of the first temperature detected by said first temperature sensor and the second temperature detected by said second temperature sensor, wherein said fan control means changes a number of cooling fans to be driven when said first temperature sensor detects the first temperature has become not less than a first threshold temperature, and when said second temperature sensor detects that the second temperature has become not less than a second threshold temperature, and wherein said fan control means controls to drive a first number of cooling fans while the first temperature detected by said first temperature sensor is not less than the first threshold temperature, and said fan control means controls to drive a second number of cooling fans while the second temperature detected by said second temperature sensor is not less than the second threshold temperature and the first temperature detected by said first temperature sensor is less than the first threshold temperature.

13. A computer system comprising:

a first device to be cooled;

a second device to be cooled, said second device being different from said first device;

a plurality of cooling fans;

a first temperature sensor which is arranged to detect a first temperature related to said first device;

a second temperature sensor which is arranged to detect a second temperature related to said second device; and fan control means for changing a number of cooling fans to be driven, based on at least one of the first temperature detected by said first temperature sensor and the second temperature detected by said second temperature sensor, wherein said fan control means changes a number of cooling fans to be driven when said first temperature sensor detects the first temperature has become not less than a first threshold temperature, and when said second temperature sensor detects that the second temperature has become not less than a second threshold temperature, and wherein said first device is a CPU, and said system further comprises means for decreasing an operation speed of the CPU when the first temperature detected by said first temperature sensor has become not less than the first threshold temperature.

14. The system according to claim 13, further comprising means for, when the temperature detected by said first temperature sensor has become not less than the first threshold temperature, controlling to selectively one of i) decreasing the operation speed of the CPU and ii) increasing the number of cooling fans to be driven.

15. A computer system comprising:

a first device to be cooled;

a second device to be cooled, said second device being different from said first device;

a plurality of cooling fans;

a first temperature sensor which is arranged to detect a first temperature related to said first device;

a first device to be cooled;

a second temperature sensor which is arranged to detect a second temperature related to said second device; and fan control means for changing a number of cooling fans to be driven, based on at least one of the first temperature detected by said first temperature sensor and the second temperature detected by said second temperature sensor, wherein said fan control means changes a number of cooling fans to be driven when said first temperature sensor detects the first temperature has become not less than a first threshold temperature, and when said second temperature sensor detects that the second temperature has become not less than a second threshold temperature, and wherein said fan control means includes:

means for, when the first temperature detected by said first temperature sensor is not less than the first threshold temperature, informing a CPU of said computer system of a temperature sensor ID indicating said first temperature sensor using an interrupt signal; and means for, when the second temperature detected by said second temperature sensor is not less than the second threshold temperature, informing the CPU of said computer system of a temperature sensor ID indicating said second temperature sensor using an interrupt signal, and wherein the CPU determines the number of cooling fans to be driven on the basis of the informed temperature sensor ID.

16. A computer system comprising:

a first device to be cooled;

a second device to be cooled, said second device being different from said first device:

a plurality of cooling fans, wherein said plurality of cooling fans are exhaust fans for exhausting air outside said computer system that accommodates the first and second devices, and said system further comprises an inlet fan for taking outer air into said computer system;

a first temperature sensor which is arranged to detect a first temperature related to said first device;

a second temperature sensor which is arranged to detect a second temperature related to said second device; and fan control means for changing a number of cooling fans to be driven, based on at least one of the first temperature detected by said first temperature sensor and the second temperature detected by said second temperature sensor, wherein said fan control means changes a number of cooling fans to be driven when said first temperature sensor detects the first temperature has become not less than a first threshold temperature, and when said second temperature sensor detects that the second temperature has become not less than a second threshold temperature.

17. A computer system comprising:

a first device to be cooled;

a second device to be cooled, said second device being different from said first device;

a first cooling fan which is arranged to lower a first temperature related to said first device;

a second cooling fan which is arranged to lower a second temperature related to said second device;

a first temperature sensor which is arranged to detect the first temperature related to said first device;

a second temperature sensor which is arranged to detect the second temperature related to said second device; and fan control means for ON/OFF controlling said first and second cooling fans, based on at least one of the first temperature detected by said first temperature sensor and the second temperature detected by said second temperature sensor, wherein said fan control means causes at least one of said first and second cooling fans to be rotated when said first temperature sensor detects the first temperature has become not less than a first threshold temperature, and when said second temperature sensor detects that the second temperature has become not less than a second threshold temperature.

18. A computer system comprising:

a first device to be cooled;

a second device to be cooled, said second device being different from said first device;

a first cooling fan which is arranged to lower a first temperature related to said first device;

a second cooling fan which is arranged to lower a second temperature related to said second device;

a first temperature sensor which is arranged to detect the first temperature related to said first device;

a second temperature sensor which is arranged to detect the second temperature related to said second device; and fan control means for ON/OFF controlling said first and second cooling fans, based on at least one of the first temperature detected by said first temperature sensor and the second temperature detected by said second temperature sensor, wherein said fan control means causes at least one of said first and second cooling fans to be rotated when said first temperature sensor detects the first temperature has become not less than a first threshold temperature, and when said second temperature sensor detects that the second temperature has become not less than a second threshold temperature, and wherein at least one of said first and second threshold temperatures is changeable by a user.

19. A computer system comprising:

a first device to be cooled;

a second device to be cooled, said second device being different from said first device;

a first cooling fan which is arranged to lower a first temperature related to said first device;

a second cooling fan which is arranged to lower a second temperature related to said second device;

a first temperature sensor which is arranged to detect the first temperature related to said first device;

a second temperature sensor which is arranged to detect the second temperature related to said second device; and fan control means for ON/OFF controlling said first and second cooling fans, based on at least one of the first temperature detected by said first temperature sensor and the second temperature detected by said second temperature sensor, wherein said fan control means causes at least one of said first and second cooling fans to be rotated when said first temperature sensor detects the first temperature has become not less than a first threshold temperature, and when said second temperature sensor detects that the second temperature has become not less than a second threshold temperature, and wherein said fan control means also ON/OFF controls said first and second cooling fans, based on whether or not the first temperature detected by said first temperature sensor has become less than a third threshold temperature and whether or not the second temperature detected by said second temperature sensor has become less than a fourth threshold temperature, and the third threshold temperature is less than the first threshold temperature and the fourth threshold temperature is less than the second threshold temperature.

20. A computer system comprising:

a first device to be cooled;

a second device to be cooled, said second device being different from said first device;

a first cooling fan which is arranged to lower a first temperature related to said first device;

a second cooling fan which is arranged to lower a second temperature related to said second device;

a first temperature sensor which is arranged to detect the first temperature related to said first device;

a second temperature sensor which is arranged to detect the second temperature related to said second device; and fan control means for ON/OFF controlling said first and second cooling fans, based on at least one of the first temperature detected by said first temperature sensor and the second temperature detected by said second temperature sensor, wherein said fan control means causes at least one of said first and second cooling fans to be rotated when said first temperature sensor detects the first temperature has become not less than a first threshold temperature, and when said second temperature sensor detects that the second temperature has become not less than a second threshold temperature, and wherein said fan control means controls to drive said first cooling fan while the first temperature detected by said first temperature sensor is not less than the first threshold temperature, and said fan control means controls to drive said second cooling fan while the second temperature detected by said second temperature sensor is not less than the second threshold temperature.

21. A computer system comprising:

a first device to be cooled;

a second device to be cooled, said second device being different from said first device;

a first cooling fan which is arranged to lower a first temperature related to said first device;

a second cooling fan which is arranged to lower a second temperature related to said second device;

a first temperature sensor which is arranged to detect the first temperature related to said first device;

a second temperature sensor which is arranged to detect the second temperature related to said second device; and fan control means for ON/OFF controlling said first and second cooling fans, based on at least one of the first temperature detected by said first temperature sensor and the second temperature detected by said second temperature sensor, wherein said fan control means causes at least one of said first and second cooling fans to be rotated when said first temperature sensor detects the first temperature has become not less than a first threshold temperature, and when said second temperature sensor detects that the second temperature has become not less than a second threshold temperature, and wherein said first device is a CPU, and said system further comprises means for decreasing an operation speed of the CPU when the first temperature detected by said first temperature sensor has become not less than the first threshold temperature.

22. The system according to claim 21, further comprising means for, when the temperature detected by said first temperature sensor has become not less than the first threshold temperature, controlling to selectively one of i) decreasing the operation speed of the CPU and ii) driving said first cooling fan.

23. A computer system comprising:

a first device to be cooled;

a second device to be cooled, said second device being different from said first device;

a first cooling fan which is arranged to lower a first temperature related to said first device;

a second cooling fan which is arranged to lower a second temperature related to said second device;

a first temperature sensor which is arranged to detect the first temperature related to said first device;

a second temperature sensor which is arranged to detect the second temperature related to said second device; and fan control means for ON/OFF controlling said first and second cooling fans, based on at least one of the first temperature detected by said first temperature sensor and the second temperature detected by said second temperature sensor, wherein said fan control means causes at least one of said first and second cooling fans to be rotated when said first temperature sensor detects the first temperature has become not less than a first threshold temperature, and when said second temperature sensor detects that the second temperature has become not less than a second threshold temperature, and wherein said fan control means includes:

means for, when the first temperature detected by said first temperature sensor is not less than the first threshold temperature, informing a CPU of said computer system of a temperature sensor ID indicating said first temperature sensor using an interrupt signal, and means for, when the second temperature detected by said second temperature sensor is not less than the second threshold temperature, informing the CPU of said computer system of a temperature sensor ID indicating said second temperature sensor using an interrupt signal, and wherein the CPU determines a corresponding one of said first and second cooling fans to be driven on the basis of the informed temperature sensor ID.

24. A computer system comprising:
a first device to be cooled;
a second device to be cooled, said second device being different from said first device;
a first cooling fan which is arranged to lower a first temperature related to said first device;
a second cooling fan which is arranged to lower a second temperature related to said second device;
a first temperature sensor which is arranged to detect the first temperature related to said first device;
a second temperature sensor which is arranged to detect the second temperature related to said second device; and
fan control means for ON/OFF controlling said first and second cooling fans, based on at least one of the first temperature detected by said first temperature sensor and the second temperature detected by said second temperature sensor, wherein said fan control means causes at least one of said first and second cooling fans to be rotated when said first temperature sensor detects the first temperature has become not less than a first threshold temperature, and when said second temperature sensor detects that the second temperature has become not less than a second threshold temperature, and wherein said first and second cooling fans are exhaust fans for exhausting air outside said computer system that accommodates the first and second devices, respectively, and said system further comprises an inlet fan for taking outer air into said computer system.

25. A cooling control method for use in a computer system having a first device to be cooled, a second device to be cooled, a cooling fan having variable rotational speed, a first temperature sensor which is arranged to detect a temperature related to said first device, and a second temperature sensor which is arranged to detect a temperature related to said second device, said method comprising the steps of:

determining whether or not a temperature detected by said first temperature sensor has become not less than a first threshold temperature and whether or not a temperature detected by said second temperature sensor has become not less than a second threshold temperature; and changing a rotational speed of said cooling fan, based on results of the determining step.

26. A cooling control method for use in a computer system having a first device to be cooled, a second device to be cooled, a plurality of cooling fans, a first temperature sensor which is arranged to detect a temperature related to said first device, and a second temperature sensor which is arranged to detect a temperature related to said second device, said method comprising the steps of:

determining whether or not a temperature detected by said first temperature sensor has become not less than a first threshold temperature and whether or not a temperature detected by said second temperature sensor has become not less than a second threshold temperature; and changing a number of cooling fans to be driven, based on results of the determination step.

27. A cooling control method for use in a computer system having a first device to be cooled, a second device to be cooled, a first cooling fan which is arranged to lower a temperature related to said first device, a second cooling fan which is arranged to lower a temperature related to said second device, a first temperature sensor which is arranged to detect the temperature related to said first device, and a second temperature sensor which is arranged to detect the temperature related to said second device, said method comprising the steps of:

determining whether or not a temperature detected by said first temperature sensor has become not less than a first threshold temperature and whether or not a temperature detected by said second temperature sensor has become not less than a second threshold temperature; and ON/OFF controlling said first and second cooling fans, based on results of the determining step.

28. A computer system comprising:
a first device generating heat;
a second device generating heat, said second device being different from said first device;
a cooling fan having variable rotational speed;
a first temperature sensor which is arranged to detect a first temperature related to said first device;
a second temperature sensor which is arranged to detect a second temperature related to said second device; and
fan control means for changing a rotational speed of said cooling fan, based on at least one of the first temperature detected by said first temperature sensor and the second temperature detected by said second temperature sensor, wherein said fan control means changes the rotational speed of said cooling fan when said first temperature sensor detects the first temperature has become not less than a first threshold temperature, and when said second temperature sensor detects that the second temperature has become not less than a second threshold temperature.

29. A computer system comprising:
a first device generating heat;
a second device generating heat, said second device being different from said first device;
a plurality of cooling fans;
a first temperature sensor which is arranged to detect a first temperature related to said first device;
a second temperature sensor which is arranged to detect a second temperature related to said second device; and
fan control means for changing a number of cooling fans to be driven, based on at least one of the first temperature detected by said first temperature sensor and the second temperature detected by said second temperature sensor, wherein said fan control means changes a number of cooling fans to be driven when said first temperature sensor detects the first temperature has become not less than a first threshold temperature, and when said second temperature sensor detects that the second temperature has become not less than a second threshold temperature.

30. A computer system comprising:

a first device generating heat;

a second device generating heat, said second device being different from said first device;

a first cooling fan which is arranged to lower a first temperature related to said first device;

a second cooling fan which is arranged to lower a second temperature related to said second device;

a first temperature sensor which is arranged to detect the first temperature related to said first device;

a second temperature sensor which is arranged to detect the second temperature related to said second device; and fan control means for ON/OFF controlling said first and second cooling fans, based on at least one of the first temperature detected by said first temperature sensor and the second temperature detected by said second temperature sensor, wherein said fan control means causes at least one of said first and second cooling fans to be rotated when said first temperature sensor detects the first temperature has become not less than a first threshold temperature, and when said second temperature sensor detects that the second temperature has become not less than a second threshold temperature.

31. A cooling control method for use in a computer system having a first device generating heat, a second device generating heat, a cooling fan having variable rotational speed, a first temperature sensor which is arranged to detect a temperature related to said first device, and a second temperature sensor which is arranged to detect a temperature related to said second device, said method comprising the steps of:

determining whether or not a temperature detected by said first temperature sensor has become not less than a first threshold temperature and whether or not a temperature detected by said second temperature sensor has become not less than a second threshold temperature; and changing a rotational speed of said cooling fan, based on results of the determining step.

32. A cooling control method for use in a computer system having a first device generating heat, a second device generating heat, a plurality of cooling fans, a first temperature sensor which is arranged to detect a temperature related to said first device, and a second temperature sensor which is arranged to detect a temperature related to said second device, said method comprising the steps of:

determining whether or not a temperature detected by said first temperature sensor has become not less than a first threshold temperature and whether or not a temperature detected by said second temperature sensor has become not less than a second threshold temperature; and changing a number of cooling fans to be driven, based on results of the determination step.

33. A cooling control method for use in a computer system having a first device generating heat, a second device generating heat, a first cooling fan which is arranged to lower a temperature related to said first device, a second cooling fan which is arranged to lower a temperature related to said second device, a first temperature sensor which is arranged to detect the temperature related to said first device, and a second temperature sensor which is arranged to detect the temperature related to said second device, said method comprising the steps of:

determining whether or not a temperature detected by said first temperature sensor has become not less than a first threshold temperature and whether or not a temperature detected by said second temperature sensor has become not less than a second threshold temperature; and ON/OFF controlling said first and second cooling fans, based on results of the determining step.

34. A cooling control method for use in a computer system having a first device including a CPU to be cooled, a second device to be cooled, a cooling fan having variable rotational speed, a first temperature sensor which is arranged to detect a temperature related to said first device, and a second temperature sensor which is arranged to detect a temperature related to said second device, said method comprising the steps of:

determining whether or not a temperature detected by said first temperature sensor has become not less than a first threshold temperature and whether or not a temperature detected by said second temperature sensor has become not less than a second threshold temperature;

changing a rotational speed of said cooling fan, based on results of the determining step; and decreasing an operation speed of the CPU when the temperature detected by said first temperature sensor has become not less than the first threshold temperature.

35. A cooling control method for use in a computer system having a first device to be cooled, a second device to be cooled, a cooling fan having variable rotational speed, a first temperature sensor which is arranged to detect a temperature related to said first device, and a second temperature sensor which is arranged to detect a temperature related to said second device, said method comprising the steps of:

determining whether or not a temperature detected by said first temperature sensor has become not less than a first threshold temperature and whether or not a temperature detected by said second temperature sensor has become not less than a second threshold temperature;

changing a rotational speed of said cooling fan, based on results of the determining step;

informing a CPU of said computer system of a temperature sensor ID indicating said first temperature sensor using an interrupt signal, when the temperature detected by said first temperature sensor is not less than the first threshold temperature;

informing the CPU of said computer system of a temperature sensor ID indicating said second temperature sensor using an interrupt signal, when the temperature detected by said second temperature sensor is not less than the second threshold temperature; and causing the CPU to determine the rotational speed of said cooling fan on the basis of the informed temperature sensor ID.

* * * * *

UNITED STATES PATENT AND TRADEMARK OFFICE
CERTIFICATE OF CORRECTION

PATENT NO.    : 6,134,667
DATED         : October 17, 2000
INVENTOR(S)   : Shinichi Suzuki et al.

It is certified that error appears in the above-identified patent and that said Letters Patent is hereby corrected as shown below:

<u>Column 17,</u>
Line 13, before "first", delete "and".

Signed and Sealed this

Twenty-first Day of May, 2002

Attest:

JAMES E. ROGAN
*Attesting Officer*    *Director of the United States Patent and Trademark Office*